(12) United States Patent
Teng et al.

(10) Patent No.: US 11,430,220 B2
(45) Date of Patent: Aug. 30, 2022

(54) METHODS AND SYSTEMS FOR IMAGE PROCESSING

(71) Applicant: SHANGHAI UNITED IMAGING HEALTHCARE CO., LTD., Shanghai (CN)

(72) Inventors: Wanli Teng, Shanghai (CN); Shurui Zhao, Shanghai (CN); Juan Feng, Shanghai (CN); Yecheng Han, Shanghai (CN); Chunhua Jiang, Shanghai (CN); Yong E, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 17/120,256

(22) Filed: Dec. 13, 2020

(65) Prior Publication Data
US 2021/0117688 A1    Apr. 22, 2021

Related U.S. Application Data

(63) Continuation of application No. PCT/CN2019/091366, filed on Jun. 14, 2019.

(30) Foreign Application Priority Data

Jun. 14, 2018 (CN) .......................... 201810614685.7
Dec. 5, 2018 (CN) .......................... 201811480295.1

(51) Int. Cl.
*G06V 20/40* (2022.01)
*G06F 9/38* (2018.01)
*G06V 10/75* (2022.01)

(52) U.S. Cl.
CPC ............ *G06V 20/41* (2022.01); *G06F 9/3871* (2013.01); *G06V 10/751* (2022.01); *G06V 20/48* (2022.01); *G06V 20/49* (2022.01)

(58) Field of Classification Search
CPC ........ G06V 20/44; G06V 20/41; G06V 20/40; G06V 20/49; G06V 10/40; G06V 20/00;
(Continued)

(56) References Cited

U.S. PATENT DOCUMENTS 5,600,731 A * 2/1997 Sezan ................... H04N 19/51
375/E7.193
8,468,532 B2   6/2013 Aguilar, Jr. et al.
(Continued)

FOREIGN PATENT DOCUMENTS

CA    2420013 C * 7/2011 ........... G06T 7/2053
CA    2884383 A1 * 3/2014 ......... G06K 9/00362
(Continued)

OTHER PUBLICATIONS

Scene Modeling for Wide Area Surveillance and Image Synthesis (Year: 2000).*
(Continued)

*Primary Examiner* — Nizar N Sivji
(74) *Attorney, Agent, or Firm* — Metis IP LLC

(57) ABSTRACT

A method for image processing is provided. The method may include: obtaining a plurality of frames, each of the plurality of frames comprising a plurality of pixels; determining, based on the plurality of frames, whether a current frame of the plurality of frames comprises a moving object; in response to determining that the current frame includes no moving object, obtaining a first count of frames, and generating a target image by superimposing the first count of frames; in response to determining that the current frame includes a moving object, obtaining a second count of frames, and generating the target image by superimposing the second count of frames.

12 Claims, 14 Drawing Sheets

(58) Field of Classification Search
CPC .... G06V 20/48; G06V 20/695; G06V 10/751; G06T 2207/10016; G06T 7/20; G06T 7/254; G06T 7/215; G06T 7/11; G06T 2207/20021; G06T 2207/30242; G06T 7/74; G06T 2207/10121; G06T 2207/20182; G06T 2207/30004; G06T 5/50; G06F 9/3871; G06F 2209/501; G06F 9/4881; G06F 9/5027
See application file for complete search history.

(56) References Cited

U.S. PATENT DOCUMENTS

| | | | |
|---|---|---|---|
| 8,782,649 B2 | 7/2014 | Jeong | |
| 9,619,290 B2 | 4/2017 | Bailey et al. | |
| 2006/0227862 A1* | 10/2006 | Campbell | G06V 20/53 375/240 |
| 2008/0127071 A1 | 5/2008 | Lu et al. | |
| 2010/0290683 A1 | 11/2010 | Demeester et al. | |
| 2012/0051593 A1 | 3/2012 | Tojo | |
| 2015/0355940 A1 | 12/2015 | Bradbury et al. | |
| 2016/0188380 A1 | 6/2016 | Eastep et al. | |
| 2017/0154427 A1* | 6/2017 | Marvin | G06T 7/246 |
| 2017/0358085 A1 | 12/2017 | Nicolardi et al. | |
| 2018/0314937 A1 | 11/2018 | Zarar et al. | |

FOREIGN PATENT DOCUMENTS

| | | | |
|---|---|---|---|
| CN | 1595433 A | 3/2005 | |
| CN | 101702232 A | 5/2010 | |
| CN | 102572380 A | 7/2012 | |
| CN | 103209321 A | 7/2013 | |
| CN | 103955491 A | 7/2014 | |
| CN | 104939861 A | 9/2015 | |
| CN | 105872310 A | 8/2016 | |
| CN | 106780649 A | 5/2017 | |
| CN | 106803865 A | 6/2017 | |
| CN | 107635101 A | 1/2018 | |
| CN | 107704322 A | 2/2018 | |
| CN | 107967150 A | 4/2018 | |
| CN | 108845883 A | 11/2018 | |
| CN | 109767392 A | 5/2019 | |
| EP | 2298164 A2 | 3/2011 | |
| JP | 4496595 B2 * | 7/2010 | G06T 7/223 |

OTHER PUBLICATIONS

Image Processing Framework for Traffic Monitoring (Year: 2011).*
International Search Report in PCT/CN2019/091366 dated Aug. 30, 2019, 6 pages.
Written Opinion in PCT/CN2019/091366 dated Aug. 30, 2019, 6 pages.
Fu, Liyuan et al., Research on the Analysis and Solution of Magnetic Resonance Imaging Artifacts, China Medical Equipment, 13(4): 20-24, 2016.
S. M. A. Salehizadeh et al., Photoplethysmograph Signal Reconstruction based on a Novel Motion Artifact Detection-reduction Approach, Annals of Biomedical Engineering, 42(11): 2251-2263, 2014.
E.A. Clancy et al., Sampling, Noise-reduction and Amplitude Estimation Issues in Surface Electromyography, Journal of Electromyography and Kinesiology, 12(1): 1-16, 2002.
Xie, Xiaolong et al., CRAT: Enabling Coordinated Register Allocation and Thread-Level Parallelism Optimization for GPUs, IEEE Transactions on Computers, 2018, 12 pages.
Liu, Hui, Optimization and Implementation of Self-Adaptive Heterogeneous Parallel Library Based on Multicore Processors, Dissertation forthe Maste's Degree in Engineering, 2015, 82 pages.
Luo, Hai, Research on CT Image Reconstruction and Motion Artifact Correction Method, China Doctoral Dissertation Full-text Database Information Technology, 2011, 117 pages.
James C. Brailean et al., Noise Reduction Filters for Dynamic Image Sequences: A Review, Proceedings of the IEEE, 83(9): 1272-1292, 1995.
Partial Supplementary European Search Report in European Application No. 19820464.4 dated May 28, 2021, 19 pages.

* cited by examiner

METHODS AND SYSTEMS FOR IMAGE PROCESSING

CROSS-REFERENCE TO RELATED APPLICATIONS

This application is a continuation of International Application No. PCT/CN2019/091366, filed on Jun. 14, 2019, which claims priority to Chinese Patent Application No. 201810614685.7, filed on Jun. 14, 2018, and Chinese Patent Application No. 201811480295.1, filed on Dec. 5, 2018, the contents of each of which are hereby incorporated by reference in its entirety.

TECHNICAL FIELD

The present disclosure generally relates to image technology, and more particularly to systems and methods for thread tuning and image processing.

BACKGROUND

In real-time acquisition of fluoroscopic images, a plurality of image frames are superimposed to reduce image noise. However, if the plurality of frames include one or more moving objects, the superimposing process of frames can induce motion artifacts, which can affect the quality of a target image that is generated based on the frames. If the superimposing process of the frames is omitted, a relatively high level of noise may exist in the target image, which may affect the clarity of the target image. Therefore, it is desirable to provide methods and systems for processing images effectively, removing or reducing motion artifacts, removing or reducing noise, and improving image clarity.

Because a plurality of frames may be processed in the acquisition of fluoroscopic images, multi-threading technology can be used to improve the processing efficiency. However, if the count of threads exceeds the count of cores of a processing device that performs the threads, the preemption of the processor resources may occur, inducing the processing time of each thread to be increased. The performance of the threads can be improved through thread tuning. In thread tuning, the computationl load of each thread may need to be repeatedly modified or adjusted to satisfy one or more corresponding constraint rules, which can affect the processing efficiency of thread tuning. Therefore, it is desirable to provide methods and systems for tuning threads (e.g., of an image processing program) more efficiently.

SUMMARY

In one aspect of the present disclosure, a method for image processing is provided. The method may include one or more of the following operations: obtaining a plurality of frames, each of the plurality of frames comprising a plurality of pixels; determining, based on the plurality of frames, whether a current frame of the plurality of frames comprises a moving object; in response to determining that the current frame includes no moving object, obtaining a first count of frames; generating a target image by superimposing the first count of frames; in response to determining that the current frame includes a moving object, obtaining a second count of frames; and generating the target image by superimposing the second count of frames.

In another aspect of the present disclosure, a method for thread tuning is provided. The method may include one or more of the following operations: obtaining a predetermined number of initial threads; testing, under each of one or more distribution modes, a first processing time for the initial threads in a parallel asynchronous processing mode; determining a longest first processing time corresponding to a target distribution mode of the one or more distribution modes; adjusting, under the target distribution mode based on one or more constraint rules, the first processing time associated with the initial threads in the parallel asynchronous processing mode; determining a second processing time for each adjusted initial thread in a single thread mode; identifying a thread tuning threshold associated with each initial thread based on the second processing time; obtaining an application program including the predetermined number of target threads, each target thread of the predetermined number of target threads corresponding to a respective initial thread; and tuning each target thread under the single thread mode based on a corresponding thread tuning threshold associated with a corresponding initial thread.

In another aspect of the present disclosure, a method for thread tuning is provided. The method may include one or more of the following operations: obtaining a predetermined number of initial threads associated with an image processing program; testing, under each of one or more distribution modes, a first processing time for the initial threads in a parallel asynchronous processing mode; determining a longest first processing time corresponding to a target distribution mode of the one or more distribution modes; adjusting, based on one or more constraint rules, the first processing time associated with the initial threads under the target distribution mode in the parallel asynchronous processing mode; determining a second processing time for each adjusted initial thread in a single thread mode; identifying a thread tuning threshold associated with each initial thread based on the second processing time; obtaining a predetermined number of target threads of the image processing program, the target threads comprising a first thread for processing an image frame at a first frame rate and a second thread for processing the image frame at a second frame rate, each target thread of the predetermined number of target threads corresponding to a respective initial thread; and obtaining an adjusted image processing program by tuning the each target thread under the single thread mode based on a corresponding thread tuning threshold associated with a corresponding initial thread.

In another aspect of the present disclosure, a system for image processing is provided. The system may include at least one storage device storing a set of instructions; and at least one processor in communication with the storage device, wherein when executing the set of instructions, the at least one processor may be configured to cause the system to perform one or more of the following operations: obtaining a plurality of frames, each of the plurality of frames comprising a plurality of pixels; determining, based on the plurality of frames, whether a current frame of the plurality of frames comprises a moving object; in response to determining that the current frame includes no moving object, obtaining a first count of frames; generating a target image by superimposing the first count of frames; in response to determining that the current frame includes a moving object, obtaining a second count of frames; and generating the target image by superimposing the second count of frames.

In another aspect of the present disclosure, a system for thread tuning is provided. The system may include at least one storage device storing a set of instructions; and at least one processor in communication with the storage device, wherein when executing the set of instructions, the at least one processor may be configured to cause the system to perform one or more of the following operations: obtaining a predetermined number of initial threads; testing, under each of one or more distribution modes, a first processing time for the initial threads in a parallel asynchronous processing mode; determining a longest first processing time corresponding to a target distribution mode of the one or more distribution modes; adjusting, under the target distribution mode based on one or more constraint rules, the first processing time associated with the initial threads in the parallel asynchronous processing mode; determining a second processing time for each adjusted initial thread in a single thread mode; identifying a thread tuning threshold associated with each initial thread based on the second processing time; obtaining an application program including the predetermined number of target threads, each target thread of the predetermined number of target threads corresponding to a respective initial thread; and tuning each target thread under the single thread mode based on a corresponding thread tuning threshold associated with a corresponding initial thread.

In another aspect of the present disclosure, a system for thread tuning is provided. The system may include at least one storage device storing a set of instructions; and at least one processor in communication with the storage device, wherein when executing the set of instructions, the at least one processor may be configured to cause the system to perform one or more of the following operations: obtaining a predetermined number of initial threads associated with an image processing program; testing, under each of one or more distribution modes, a first processing time for the initial threads in a parallel asynchronous processing mode; determining a longest first processing time corresponding to a target distribution mode of the one or more distribution modes; adjusting, based on one or more constraint rules, the first processing time associated with the initial threads under the target distribution mode in the parallel asynchronous processing mode; determining a second processing time for each adjusted initial thread in a single thread mode; identifying a thread tuning threshold associated with each initial thread based on the second processing time; obtaining a predetermined number of target threads of the image processing program, the target threads comprising a first thread for processing an image frame at a first frame rate and a second thread for processing the image frame at a second frame rate, each target thread of the predetermined number of target threads corresponding to a respective initial thread; and obtaining an adjusted image processing program by tuning the each target thread under the single thread mode based on a corresponding thread tuning threshold associated with a corresponding initial thread.

In another aspect of the present disclosure, a system is provided. The system may include an image acquisition module configured to obtain a plurality of frames, each of the plurality of frames comprising a plurality of pixels; a tracing module configured to determine, based on the plurality of frames, whether a current frame of the plurality of frames comprises a moving object; and a blur removal module configured to in response to determining that the current frame includes no moving object, obtain a first count of frames, and generate a target image by superimposing the first count of frames; and in response to determining that the current frame includes a moving object, obtain a second count of frames, and generate the target image by superimposing the second count of frames.

In another aspect of the present disclosure, a system is provided. The system may include an obtaining module configured to obtain a predetermined number of initial threads; a testing module configured to test, under each of one or more distribution modes, a first processing time for the initial threads in a parallel asynchronous processing mode; an adjustment module configured to determine a longest first processing time corresponding to a target distribution mode of the one or more distribution modes, and adjust, under the target distribution mode based on one or more constraint rules, the first processing time associated with the initial threads in the parallel asynchronous processing mode; and a determination module configured to determine a second processing time for each adjusted initial thread in a single thread mode, and identify a thread tuning threshold associated with each initial thread based on the second processing time. The obtaining module may be further configured to obtain an application program including the predetermined number of target threads, each target thread of the predetermined number of target threads corresponding to a respective initial thread. The system may further include a tuning module configured to tune each target thread under the single thread mode based on a corresponding thread tuning threshold associated with a corresponding initial thread.

In another aspect of the present disclosure, a system is provided. The system may include an obtaining module configured to obtain a predetermined number of initial threads associated with an image processing program; a testing module configured to test, under each of one or more distribution modes, a first processing time for the initial threads in a parallel asynchronous processing mode; an adjustment module configured to determine a longest first processing time corresponding to a target distribution mode of the one or more distribution modes, and adjust, based on one or more constraint rules, the first processing time associated with the initial threads under the target distribution mode in the parallel asynchronous processing mode; and a determination module configured to determine a second processing time for each adjusted initial thread in a single thread mode, and identify a thread tuning threshold associated with each initial thread based on the second processing time. The obtaining module may be further configured to obtain a predetermined number of target threads of the image processing program, the target threads comprising a first thread for processing an image frame at a first frame rate and a second thread for processing the image frame at a second frame rate, each target thread of the predetermined number of target threads corresponding to a respective initial thread. The system may further include a tuning module configured to obtain an adjusted image processing program by tuning the each target thread under the single thread mode based on a corresponding thread tuning threshold associated with a corresponding initial thread.

In another aspect of the present disclosure, a non-transitory computer readable medium storing instructions is provided. The instructions, when executed by at least one processor, may cause the at least one processor to implement a method including: obtaining a plurality of frames, each of the plurality of frames comprising a plurality of pixels; determining, based on the plurality of frames, whether a current frame of the plurality of frames comprises a moving object; in response to determining that the current frame includes no moving object, obtaining a first count of frames; generating a target image by superimposing the first count of frames; in response to determining that the current frame includes a moving object, obtaining a second count of frames; and generating the target image by superimposing the second count of frames.

In another aspect of the present disclosure, a non-transitory computer readable medium storing instructions is provided. The instructions, when executed by at least one processor, may cause the at least one processor to implement a method including: obtaining a predetermined number of initial threads; testing, under each of one or more distribution modes, a first processing time for the initial threads in a parallel asynchronous processing mode; determining a longest first processing time corresponding to a target distribution mode of the one or more distribution modes; adjusting, under the target distribution mode based on one or more constraint rules, the first processing time associated with the initial threads in the parallel asynchronous processing mode; determining a second processing time for each adjusted initial thread in a single thread mode; identifying a thread tuning threshold associated with each initial thread based on the second processing time; obtaining an application program including the predetermined number of target threads, each target thread of the predetermined number of target threads corresponding to a respective initial thread; and tuning each target thread under the single thread mode based on a corresponding thread tuning threshold associated with a corresponding initial thread.

In another aspect of the present disclosure, a non-transitory computer readable medium storing instructions is provided. The instructions, when executed by at least one processor, may cause the at least one processor to implement a method including: obtaining a predetermined number of initial threads associated with an image processing program; testing, under each of one or more distribution modes, a first processing time for the initial threads in a parallel asynchronous processing mode; determining a longest first processing time corresponding to a target distribution mode of the one or more distribution modes; adjusting, based on one or more constraint rules, the first processing time associated with the initial threads under the target distribution mode in the parallel asynchronous processing mode; determining a second processing time for each adjusted initial thread in a single thread mode; identifying a thread tuning threshold associated with each initial thread based on the second processing time; obtaining a predetermined number of target threads of the image processing program, the target threads comprising a first thread for processing an image frame at a first frame rate and a second thread for processing the image frame at a second frame rate, each target thread of the predetermined number of target threads corresponding to a respective initial thread; and obtaining an adjusted image processing program by tuning the each target thread under the single thread mode based on a corresponding thread tuning threshold associated with a corresponding initial thread.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a" "an," and "the" may be intended to include the plural forms as well, unless the context clearly indicates otherwise, It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
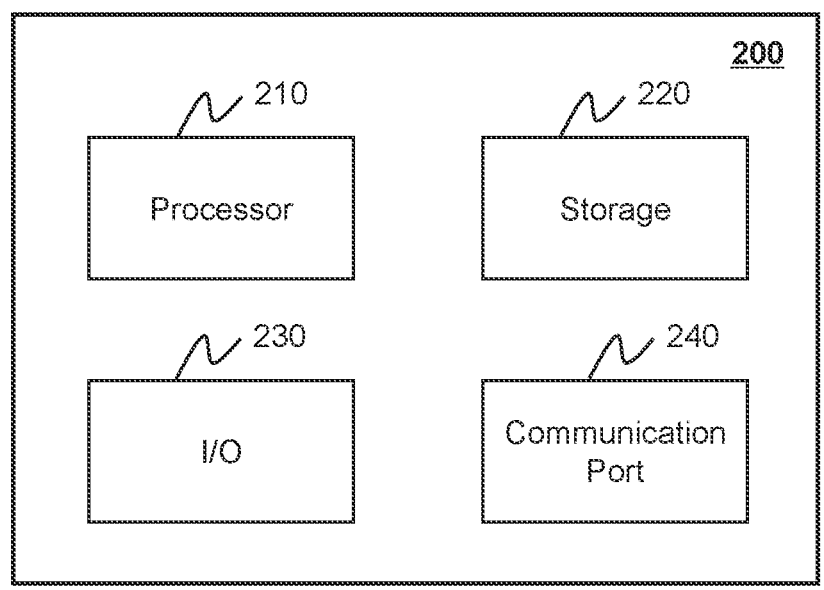
FIG. 2 is a schematic diagram illustrating exemplary hardware and/or software components of an exemplary computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

One aspect of the present disclosure relates to methods, systems, computing devices, and computer readable storage mediums for thread tuning, which may identify a thread tuning threshold associated with each initial thread (or each adjusted initial thread), obtain an application program including a plurality of target threads, and tune each target thread under a single thread mode based on the corresponding thread tuning threshold. Each initial thread may be adjusted, based on one or more constraint rules, under a target distribution mode in the parallel asynchronous processing mode. The thread tuning threshold may be determined according to the processing time of each adjusted initial thread in the single thread mode, and the processing time may be adjusted under the distribution mode with the lowest load performance, and based on constraint rule(s). The performances of the distribution modes and the situation that a plurality of threads may compete for the CPU cores may be considered. Therefore, the thread tuning threshold(s) may represent the most appropriate processing time of the target thread(s), and can serve as performance parameter(s) for thread tuning. The processing time of a target thread can be directly compared with corresponding thread tuning threshold, and thus, unnecessary repeated tuning can be eliminated, and accordingly, the processing efficiency of multi-thread tuning can be improved.

Another aspect of the present disclosure relates to methods, systems, computing devices, and computer readable storage mediums for image processing, which may obtain a plurality of frames, detect whether a current frame of the plurality of frames includes a motion, and/or determine (or identify) whether the current frame of the plurality of frames includes a moving object. If it is detected that the current frame of the plurality of frames includes a moving object, a second count of frames may be acquired at a second frame rate, and/or a target image may be generated by superimposing the second count of frames. Otherwise, a first count of frames may be acquired at a first frame rate, and/or a target image may be generated by superimposing the first count of frames. The second count may be less than the first count. The second frame rate may be larger than the first frame rate. Through adjusting the count of frames to be acquired and/or the frame rate, based on whether the current frame includes a moving object, the superimposing of a relatively small count of frames may ensure that the target image includes a relatively low level of noise or no noise, and accordingly, the clarity of the target image may be improved.

According to a further aspect of the present disclosure, the thread tuning may be used in the image processing program. For example, the initial thread(s) may be determined according to the target threads in the image processing program. In some embodiments, the system and method may obtain a predetermined number of initial threads associated with an image processing program, test a first processing time (e.g., a total processing time) for the initial threads under each of one or more (predetermined) distribution modes and/or in a parallel asynchronous processing mode, and determine a longest first processing time corresponding to a target distribution mode of the one or more distribution modes. The system and method may adjust, based on one or more constraint rules, the first processing time associated with the initial threads under the target distribution mode in the parallel asynchronous processing mode. A second processing time for each adjusted initial thread may be determined in a single thread mode. A thread tuning threshold associated with each initial thread (or each adjusted initial thread) may be identified based on the second processing time. A plurality of target threads of the image processing program may be obtained. An adjusted image processing program may be obtained by tuning the each target thread under the single thread mode based on a corresponding thread tuning threshold associated with a corresponding initial thread (or a corresponding adjusted initial thread). The system and method may avoid unnecessary repeated thread tuning operations, and improve the processing efficiency of multi-thread tuning. Besides, the target image obtained based on the image processing program may include a relatively low level of noise or no noise, and accordingly, the clarity of the target image may be improved.

Figure 1:
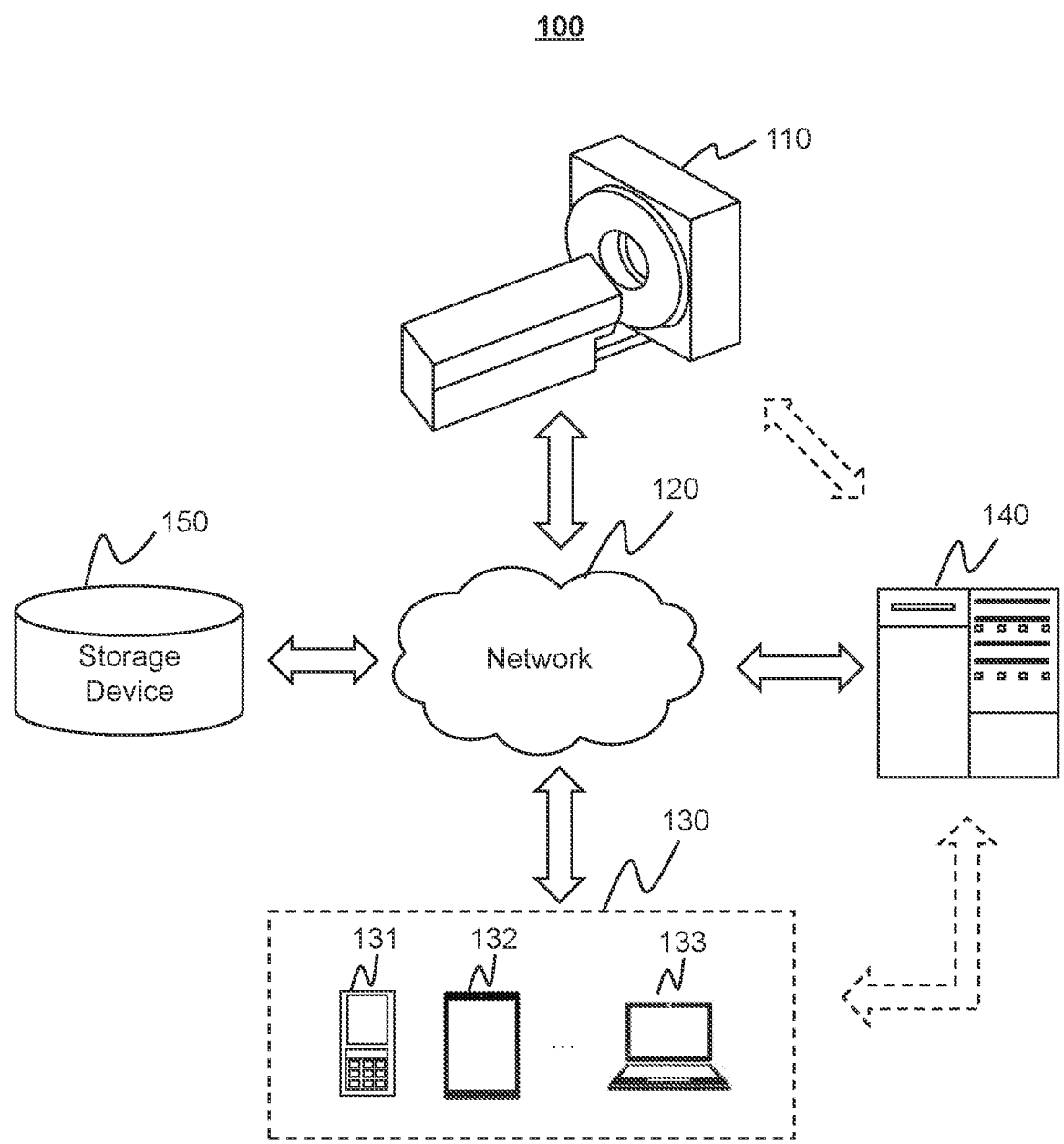
FIG. 1 is a schematic diagram illustrating an exemplary image processing system according to some embodiments of the present disclosure.

FIG. 1 is a schematic diagram illustrating an exemplary image processing system according to some embodiments of the present disclosure. The image processing system 100 may include a scanner 110, a network 120, one or more terminals 130, a processing device 140, and a storage device 150. The components in the image processing system 100 may be connected in one or more of various ways. Merely by way of example, the scanner 110 may be connected to the processing device 140 through the network 120. As another example, the scanner 110 may be connected to the processing device 140 directly as indicated by the bi-directional arrow in dotted lines linking the scanner 110 and the processing device 140. As still another example, the storage device 150 may be connected to the processing device 140 directly or through the network 120. As still another example, the terminal 130 may be connected to the processing device 140 directly (as indicated by the bi-directional arrow in dotted lines linking the terminal 130 and the processing device 140) or through the network 120.

The scanner 110 may generate or provide image(s) via scanning a subject or a part of the subject. In some embodiments, the scanner 110 may be a medical imaging device, for example, a positron emission tomography (PET) device, a single-photon emission computed tomography (SPECT) device, a computed tomography (CT) device, a magnetic resonance imaging (MRI) device, or the like, or any combination thereof. In some embodiments, the scanner 110 may include a single-modality scanner. The single-modality scanner may include an MRI scanner, a CT scanner, a PET scanner, a cone beam CT (CBCT) imaging device, a single photon emission tomography (SPET) imaging device, an X-ray (XR) imaging device, a full-field digital mammography (FFDM) imaging device, or a digital breast tomosynthesis (DBT) imaging device, or the like, or any combination thereof. For example, the scanner 110 may be a C-arm X-ray machine. In some embodiments, the scanner 110 may include a multi-modality scanner. The multi-modality scanner may include a positron emission tomography-computed tomography (PET-CT) scanner, a positron emission tomography-magnetic resonance imaging (PET-MRI) scanner, a SPET-CT scanner, or the like, or any combination thereof. The multi-modality scanner may perform multi-modality imaging simultaneously. For example, the PET-CT scanner may generate structural X-ray CT data and functional PET data simultaneously in a single scan. The PET-MRI scanner may generate MRI data and PET data simultaneously in a single scan.

In some embodiments, the subject may include a body, substance, or the like, or any combination thereof. In some embodiments, the subject may include a specific portion of a body, such as a head, a thorax, an abdomen, or the like, or any combination thereof. In some embodiments, the subject may include a specific organ, such as a breast, an esophagus, a trachea, a bronchus, a stomach, a gallbladder, a small intestine, a colon, a bladder, a ureter, a uterus, a fallopian tube, etc. In some embodiments, the subject may include a physical model (also referred to as a mockup). The physical model may include one or more materials constructed as different shapes and/or dimensions. Different parts of the physical model may be made of different materials. Different materials may have different X-ray attenuation coefficients, different tracer isotopes, and/or different hydrogen proton contents. Therefore, different parts of the physical model may be recognized by the image processing system 100. In the present disclosure, "object" and "subject" are used interchangeably. In some embodiments, the scanner 110 may include a scanning table. The subject may be placed on the scanning table for imaging.

In some embodiments, the scanner 110 may transmit the image(s) via the network 120 to the processing device 140, the storage device 150, and/or the terminal(s) 130. For example, the image(s) may be sent to the processing device 140 for further processing or may be stored in the storage device 150.

The network 120 may include any suitable network that can facilitate the exchange of information and/or data for the image processing system 100. In some embodiments, one or more components of the image processing system 100 (e.g., the scanner 110, the terminal 130, the processing device 140, the storage device 150) may communicate information and/or data with one or more other components of the image processing system 100 via the network 120. For example, the processing device 140 may obtain one or more images from the scanner 110 via network 120. As another example, the processing device 140 may obtain one or more images from the storage device 150 via the network 120. As another example, the processing device 140 may obtain user instructions from the terminal 130 via the network 120. The network 120 may be and/or include a public network (e.g., the Internet), a private network (e.g., a local area network (LAN), a wide area network (WAN))), a wired network (e.g., an Ethernet network), a wireless network (e.g., an 802.11 network, a Viii-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the Ike, or any combination thereof. In some embodiments, the network 120 may include one or more network access points. For example, the network 120 may include wired and/or wireless network access points such as base stations and/or internet exchange points through which one or more components of the image processing system 100 may be connected to the network 120 to exchange data and/or information.

Figure 3:
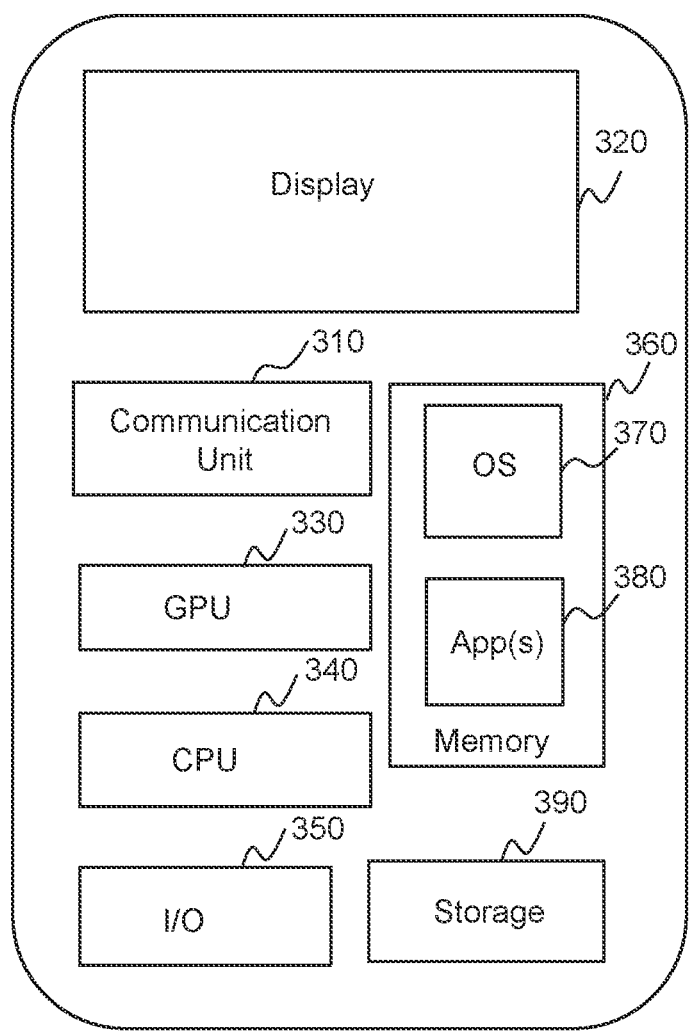
FIG. 3 is a schematic diagram illustrating exemplary hardware and/or software components of an exemplary mobile device on which the terminal may be implemented according to some embodiments of the present disclosure.

The terminal(s) 130 may include a mobile device 131, a tablet computer 132, a laptop computer 133, or the Ike, or any combination thereof. In some embodiments, the mobile device 131 may include a smart home device, a wearable device, a smart mobile device, a virtual reality device, an augmented reality device, or the like, or any combination thereof. Merely by way of example, the terminal 130 may include a mobile device as illustrated in FIG. 3. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footwear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing device 140.

The processing device 140 may process data and/or information obtained from the scanner 110, the terminal 130, and/or the storage device 150. For example, the processing device 140 may obtain a predetermined number of initial threads associated with an image processing program. As another example, the processing device 140 may test a first processing time for the initial threads in a parallel asynchronous processing mode under each of one or more distribution modes. As still another example, the processing device 140 may determine a longest first processing time corresponding to a target distribution mode of the one or more distribution modes. As still another example, the processing device 140 may adjust the first processing time associated with the initial threads under the target distribution mode in the parallel asynchronous processing mode based on one or more constraint rules. As still another example, the processing device 140 may determine a second processing time for each adjusted initial thread in a single thread mode. As still another example, the processing device 140 may identify a thread tuning threshold associated with each initial thread based on the second processing time. As still another example, the processing device 140 may obtain a plurality of target threads of the image processing program. As still another example, the processing device 140 may obtain an adjusted image processing program by tuning each target thread under the single thread mode based on a corresponding thread tuning threshold associated with a corresponding initial thread. More descriptions of the processing device 140 may be found elsewhere in the present disclosure (e.g., FIGS. 7 and 14, and descriptions thereof).

In some embodiments, the processing device 140 may be a single server or a server group. The server group may be centralized or distributed. In some embodiments, the processing device 140 may be local or remote. For example, the processing device 140 may access information and/or data stored in the scanner 110, the terminal 130, and/or the storage device 150 via the network 120. As another example, the processing device 140 may be directly connected to the scanner 110, the terminal 130 and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2. In some embodiments, the processing device 140 may include a central processing unit (CPU). The CPU may include a single-core CPU, a Dual-core CPU, a Quad-core CPU, a Hex-core CPU, an Octa-core CPU, or the like, or any combination thereof.

The storage device 150 may store data, instructions, and/or any other information. In some embodiments, the storage device 150 may store data obtained from the scanner 110, the terminal 130 and/or the processing device 140. For example, the storage device 150 may store one or more images obtained from the scanner 110. As another example, the storage device 150 may store a predetermined number of initial threads associated with image processing obtained by the processing device 140. As still another example, the storage device 150 may store one or more thread tuning thresholds (associated with one or more initial threads) identified by the processing device 140. In some embodiments, the storage device 150 may store data and/or instructions that the processing device 140 may execute or use to perform exemplary methods described in the present disclosure. For example, the storage device 150 may store instructions that the processing device 140 may execute or use to obtain one or more initial threads. As another example, the storage device 150 may store instructions that the processing device 140 may execute or use to test a first processing time for the initial threads in a parallel asynchronous processing mode under each of one or more distribution modes. As still another example, the storage device 150 may store instructions that the processing device 140 may execute or use to determine a longest first processing time corresponding to a target distribution mode of the one or more distribution modes. As still another example, the storage device 150 may store instructions that the processing device 140 may execute or use to determine a second processing time for each adjusted initial thread in a single thread mode. As still another example, the storage device 150 may store instructions that the processing device 140 may execute or use to identify a thread tuning threshold associated with each initial thread based on the second processing time. As still another example, the storage device 150 may store instructions that the processing device 140 may execute or use to obtain an adjusted image processing program by tuning the each target thread under the single thread mode based on a corresponding thread tuning threshold associated with a corresponding initial thread.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components of the image processing system 100 (e.g., the processing device 140, the terminal 130). One or more components of the image processing system 100 may access the data or instructions stored in the storage device 150 via the network 120. In some embodiments, the storage device 150 may be directly connected to or communicate with one or more other components of the image processing system 100 (e.g., the processing device 140, the terminal 130). In some embodiments, the storage device 150 may be part of the processing device 140.

FIG. 2 is a schematic diagram illustrating exemplary hardware and/or software components of an exemplary computing device on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process data obtained from the scanner 110, the terminal 130, the storage device 150, and/or any other component of the image processing system 100. In some embodiments, the processor 210 may test a first processing time for the initial threads in a parallel asynchronous processing mode under each of one or more distribution modes. The initial threads may be obtained from the image processing system 100. In some embodiments, the processor 210 may identify a thread tuning threshold associated with each initial thread. In some embodiments, the processor 210 may obtain an adjusted image processing program by tuning the each target thread under the single thread mode based on a corresponding thread tuning threshold associated with a corresponding initial thread. In some embodiments, the processor 210 may include one or more hardware processors, such as a microcontroller, a microprocessor, a reduced instruction set computer (RISC), an application specific integrated circuits (ASICs), an application-specific instruction-set processor (ASP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the radiation delivery device 110, the terminal 130, the storage device 150, and/or any other component of the image processing system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store an image processing program for processing one or more images, and/or a thread tuning program for tuning one or more threads.

The I/O 230 may input and/or output signals, data, information, etc. In some embodiments, the I/O 230 may enable user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the radiation delivery device 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phoney™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the image processing system 100 via the network 120. In some embodiments, a user may input parameters to the image processing system 100, via the mobile device 300.

In order to implement various modules, units and their functions described above, a computer hardware platform may be used as hardware platforms of one or more elements (e.g., the processing device 140 and/or other components of the image processing system 100 described in FIG. 1). Since these hardware elements, operating systems and program languages are common; it may be assumed that persons skilled in the art may be familiar with these techniques and they may be able to provide information needed in the imaging according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4:
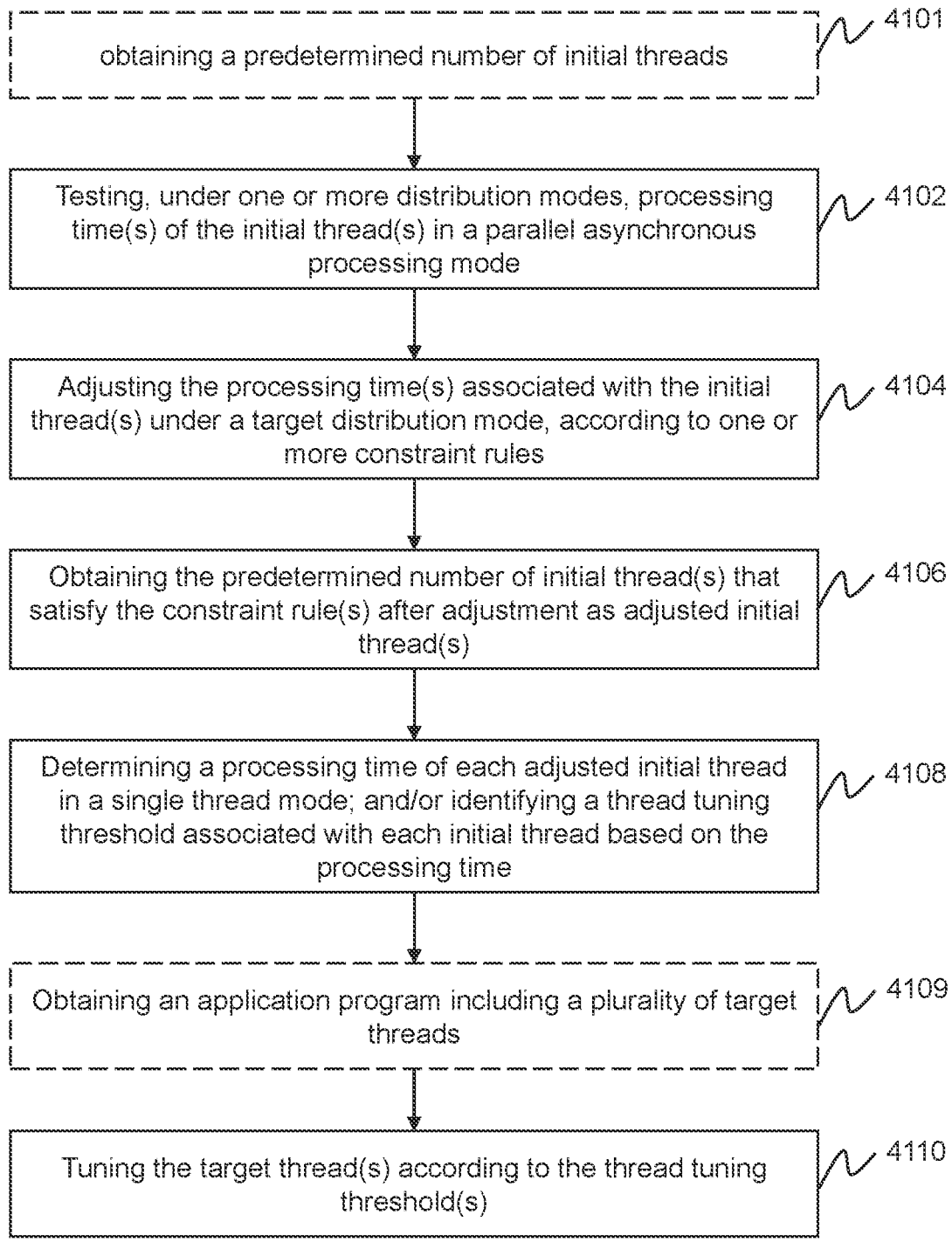
FIG. 4 is a flowchart illustrating an exemplary process for thread tuning according to sonic embodiments of the present disclosure.

FIG. 4 is a flowchart illustrating an exemplary process for thread tuning according to some embodiments of the present disclosure. In some embodiments, process 400 may be executed by the image processing system 100. For example, process 400 may be implemented as a set of instructions (e.g., an application) stored in one or more storage devices (e.g., the storage device 150, the storage 220, and/or the storage 390) and invoked and/or executed by the processing device 140 (implemented on, for example, the processor 210 of the computing device 200, and the CPU 340 of the mobile device 300). The operations of the process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In some embodiments, as shown in FIG. 4, an exemplary thread tuning process is provided. The process 400 may include one or more of the following operations:

In 4101, a predetermined number of initial threads may be obtained. In some embodiments, the processing device 140 (e.g., the obtaining module 7406) may perform operation 4101. A thread may refer to a sequence of programmed instructions that can be managed independently by a scheduler of an operating system installed on a processor. In some embodiments, the initial threads may be generated or programmed by a user (e.g., an engineer). In some embodiments, the initial threads may be obtained from one or more storage devices (e.g., the storage device 150, the storage 220, and/or the storage 390) and/or an external data source. In some embodiments, the predetermined number may be set by the user. In some embodiments, the predetermined number may be determined according to the number (or count) of the target threads in an application program illustrated in 4109.

In 4102, processing time(s) of the initial thread(s) may be tested under one or more (predetermined) distribution modes and/or in a parallel asynchronous processing mode.

In some embodiments, the processing device 140 (e.g., the testing module 7402) may perform operation 4102.

The predetermined number (or count) of the initial threads may refer to the number (or count) of the cores in the central processing unit (CPU) (of a computing device (e.g., the processing device 140)) and/or the number (or count) of the threads in the CPU. In some embodiments, the number of CPU cores corresponding to the number of threads CPUs may be two cores with four threads, four cores with four threads, and/or four cores with eight threads. If the number of threads is equal to the number of CPU cores, each thread may occupy one core for computational processing. However, if the number of threads exceeds the number of CPU cores, the threads may preempt the CPU resources, resulting in longer processing time for the threads. Therefore, it is desirable to perform thread tuning. In some embodiments, if the number of threads exceeds the number of cores, thread tuning may be performed according to process 400.

In some embodiments, a thread may also be referred to as a lightweight process (LWP). A thread may be the smallest unit of a program execution flow. In some embodiments, a standard thread may include a thread ID, a current instruction pointer, a register set, a stack, or the like. In some embodiments, a thread may be an entity in a process, and may be a basic unit that is independently scheduled and/or dispatched by the computing device. In some embodiments, the thread may be scheduled, according to one or more strategies, to the CPU to be executed.

Specifically, in some embodiments, the load performance of a thread may be measured by the processing time of the thread. If the processing time is relatively long, the load performance of the thread may be relatively low. If the processing time is relatively short, the load performance may be relatively high. The processing time(s) of the predetermined number of initial threads may be tested under one or more predetermined distribution modes, and/or in a parallel asynchronous processing mode. In some embodiments, the processing time may refer to a total processing time for all the initial threads to be processed. If the processing time is relatively long, the load performance of the threads under the distribution mode may be relatively low. The predetermined distribution modes may include various distribution modes, including, for example, a first distribution mode based on an even allocation of the total processing time (among the initial threads) (also referred to as an even distribution mode), a second distribution mode based on an allocation from small to large of the total processing time (among the initial threads), a third distribution mode based on an allocation from large to small of the total processing time (among the initial threads), or the like, or a combination thereof. In some embodiments, the processing time of the predetermined number of threads in the parallel asynchronous processing mode and under different distribution modes may be tested separately.

Merely by way of example, in image processing, the parallel asynchronous processing mode may refer that thread(s) process image(s) at a certain frame frequency, and the thread(s) can process a next image without waiting for the processing of an entire current image to be finished. That is, multiple threads may process multiple images at the same time. Moreover, because the threads compete for CPU resources in the parallel asynchronous processing mode, the processing time may be excessively consumed because of competition, thereby increasing the total processing time (of the thread(s)) in the parallel asynchronous processing mode. That is, even if the processing time is preliminarily allocated to the threads, the actual processing time may be much longer than the processing time allocated to the threads. For example, if the distribution mode is the even distribution mode in which the total processing time is evenly allocated to two cores with four threads, two threads compete for one core, and the processing time allocated to the two threads that compete for one core is, on average, 45 ms, then an actual processing time of the threads may be about 145 ms as a result of competition.

In 4104, the processing time(s) associated with the initial thread(s) may be adjusted, under a target distribution mode, and/or according to one or more constraint rules.

In some embodiments, the processing device 140 (e.g., the adjustment module 7404) may perform operation 4104. In some embodiments, a longest processing time (e.g., a longest total processing time of the predetermined number of initial threads) corresponding to a target distribution mode of the one or more distribution modes may be determined.

Specifically, in some embodiments, the target distribution mode may refer to a distribution mode that has a longest processing time, i.e., a distribution mode that has the lowest load performance. In some embodiments, in the process of program running, if the distribution mode with the lowest load performance meets the requirements of the system (e.g., the image processing system 100), then other distribution modes may naturally meet the requirements of the system. Therefore, the distribution mode with the longest processing time may be selected. In some embodiments, under the distribution mode with the longest processing time, the processing time of the predetermined number of initial threads may be adjusted according to one or more constraint rules. Exemplary constraint rule (s) may include a first constraint associated with the processing time of a thread (e.g., each thread) of the predetermined number of initial threads, and/or a second constraint associated with the total processing time of the predetermined number of initial threads in the parallel asynchronous processing mode.

In some embodiments, each thread may need to satisfy a first constraint. In some embodiments, the first constraints for different threads may be the same or different. For example, if the predetermined number of the threads is 3, then a first thread may have a corresponding first constraint (e.g., 20 ms), a second thread may have a corresponding second constraint (e.g., 30 ms), and a third thread may have a corresponding first constraint (e.g., 40 ms). In some embodiments, the first constraint associated with the processing time of each initial thread may also be referred to as a processing time constraint. In some embodiments, the second constraint associated with the total processing time of the predetermined number of initial threads may also be referred to as a total processing time constraint. In some embodiments, the constraint rule(s) may be used to limit the processing time(s) of the thread(s), so that the thread(s) may satisfy application requirements after adjustment. In some embodiments, the constraint rule(s) may be determined by the image processing system 100, or may be preset by a user or operator via the terminal(s) 130. In some embodiments, the constraint rule(s) may be determined according to one or more external conditions (e.g., the count of CPU cores, CPU performance, internal memory size, or the like) and/or one or more application requirements. In some embodiments, the constraint rule(s) may be predetermined and stored in the storage device 150. In some embodiments, other exemplary constraint rule(s) may include a constraint associated with an internal memory, a CPU consumption, or the like, or a combination thereof.

In 4106, the predetermined number of initial thread(s) that satisfy the constraint rule(s) after adjustment may be obtained as adjusted initial thread(s).

In some embodiments, the processing device 140 (e.g., the obtaining module 7406) may perform operation 4106.

Specifically, in some embodiments, the processing time of the predetermined number of initial threads may be adjusted to satisfy the processing time constraint associated with each thread, and the total processing time constraint associated with the predetermined number of threads. In some embodiments, after adjustment, the threads that satisfy the constraint rule(s) may be obtained as adjusted initial threads.

In some embodiments, the adjustment of the initial thread(s) may include modifying the programmed instructions of the initial thread(s), adjusting the size(s) of matrix(es) involved in matrix computation of the initial thread(s), adjusting a computational manner used in the initial thread(s), or the like, or a combination thereof. For example, if the size of an initial matrix involved in matrix computation of an initial thread is M×N (M and N may be positive integers), and the processing time of the initial thread is larger than the processing time constraint, then the size of the initial matrix may be adjusted to P×Q (P and Q may be positive integers, P may be smaller than M, and/or Q may be smaller than N) to ensure that the processing time of the initial thread is smaller than or equal to the processing time constraint. As another example, the computational manner of the initial thread(s) may be adjusted by simplifying a computational process, optimizing one or more computational operations, altering one or more computational algorithms, or the like.

In 4108, a processing time of each adjusted initial thread may be determined in a single thread mode, and/or a thread tuning threshold associated with each initial thread (or each adjusted initial thread) may be identified based on the processing time.

In some embodiments, the processing device 140 (e.g., the determination module 7408) may perform operation 4108.

Specifically, in some embodiments, in system operation, threads may be run in the parallel asynchronous processing mode. However, thread tuning may be generally performed in a synchronous processing mode according to one or more thread tuning thresholds and/or one or more tuning algorithms. The synchronous processing mode may refer to a mode in which a single thread occupies all the cores during processing. The synchronous processing mode may also be referred to as a single thread mode. Therefore, in order to meet the actual tuning requirements (e.g., the constraint rule(s)), each thread in the adjusted initial thread may need to be processed in the single thread mode and the processing time may be obtained. For example, in image processing, the single thread mode may refer to a mode in which a plurality of threads successively process images, and a single thread may occupy all the cores at one time for image processing. In the single thread mode, before processing the next image, it may need to wait for the processing of the current image to be finished. The parallel asynchronous processing mode may be different from the synchronous processing mode (or the single thread mode).

In the synchronous processing mode, a thread may occupy all the cores, and thus, all the CPU resources may be used to process the same image at the same time. Therefore, there may be no competition for CPU resources between the threads. If there is a CPU competition, relatively long processing time may be consumed due to the competition of CPU resources. The processing time in the case of no CPU resources competition may be the actual processing time of the thread(s). Therefore, the processing time of each adjusted initial thread in the single thread mode may be obtained. And the thread tuning threshold(s) may be determined according to the processing time(s).

In some embodiments, the processing time of an adjusted initial thread in the single thread mode may be directly designated as a thread tuning threshold. In some embodiments, the processing time of an adjusted initial thread in the single thread mode multiplied by a coefficient (e.g., 0.1, 0.2, 0.3, 0.4, 0,5, 0.6, 0.7, 0.8, 0.9, etc.) may be designated as a thread tuning threshold. In some embodiments, each thread may have a corresponding thread tuning threshold. For example, if the predetermined number of the threads is 3, then a first thread may have a corresponding first thread tuning threshold (e.g., 20 ms), a second thread may have a corresponding second thread tuning threshold (e.g., 30 ms), and a third thread may have a corresponding third thread tuning threshold (e.g., 40 ms). In some embodiments, the thread tuning thresholds corresponding to different threads may be the same or different.

In 4109, an application program may be obtained. In sortie embodiments, the processing device 140 (e.g., the obtaining module 7406) may perform operation 4109. In some embodiments, the application program may relate to image processing. In some embodiments, the application program may include one or more target threads. In some embodiments, the number (or count) of the target threads may be the same as the predetermined number. In some embodiments, each target thread may correspond to an initial thread (or adjusted initial thread). In some embodiments, the computation amount, the computational manner, the computation algorithm(s), and/or the processing algorithm(s), or the like, of (or used in) each target thread may be similar to that of (or used in) the corresponding initial thread (or adjusted initial thread). In some embodiments, operation 4109 may be performed before operation 4101, and the predetermined number may be determined according to the count of the target threads. For example, the count of the target threads obtained in 4109 may be designated as the predetermined number, and the predetermined number of initial threads may be obtained.

In 4110, the target thread(s) may be tuned according to the thread tuning threshold(s).

In some embodiments, the processing device 140 (e.g., the tuning module 7410) may perform operation 4110. As used herein, thread tuning may refer to modifying the target thread(s) so that the target thread(s) satisfy the constraint rules as illustrated above. In some embodiments, thread tuning may include adjusting one or more programmed instructions (or program codes) of the target thread(s), adding one or more new threads to share a working burden of the target thread(s), adjusting the distribution of internal memory, or the like, or a combination thereof. In some embodiments, the adjustment of the programmed instructions (or program codes) of the target thread(s) may include modifying the programmed instructions of the initial thread(s), adjusting the size(s) of matrix(es) involved in matrix computation of the initial thread(s), adjusting a computational manner used in the initial thread(s), or the like, or a combination thereof. In some embodiments, the target thread(s) may be tuned (or adjusted) while keeping the count of the adjusted target thread(s) equal to the predetermined number. In some embodiments, thread tuning may be performed according to one or more thread tuning algorithms. Exemplary thread tuning algorithms may include a tasks optimization algorithm based on energy-effectiveness model (TO-EEM), an ant colony optimization algorithm for thread scheduling (ACOTS), or the like. More descriptions of thread tuning may be found elsewhere in the present disclosure (e.g., FIG. 6, and the descriptions thereof).

Specifically, a thread tuning threshold may be the processing time of a thread in the single thread mode. For each single thread involved in a multi-threaded application program, if the processing time of the thread is longer than the thread tuning threshold (corresponding to the thread), the thread may need to be tuned until the thread tuning threshold is met (i.e., the processing time is less than or equal to the thread tuning threshold in the single thread mode). The thread(s) that satisfy the thread tuning threshold(s) may be actually used in the application program.

It may be understood that in some embodiments, the number of threads may be constant in operations 4102 through 4110. For example, if the tested predetermined number of threads include two specific threads, the thread tuning threshold(s) may be used for a situation with two specific threads. If three specific threads are tested, the thread tuning threshold(s) may be used for a situation with three specific threads.

It should be noted that in some embodiments, if one or more new threads are added in thread tuning in 4110, then the predetermined number of the initial threads may be increased accordingly, and one or more of operations 4102 through 4110 may need to be performed again. For example, if the initial threads include four threads, and the initial threads do not satisfy one or more of the constraint rules after adjustment, then a new thread may be added, and five initial threads may be obtained. In 4102, the (total) processing time of the five threads may be tested under one or more distribution modes in the parallel asynchronous processing mode. In 4104, the processing times associated with the five threads may be adjusted under the target distribution mode (with a longest total processing time of the five threads) according to the constraint rules. In 4106, the five threads that satisfy the constraint rules after adjustment may be obtained as five adjusted initial threads. In 4108, the processing time of each of the five adjusted initial threads may be determined in a single thread mode, and/or a thread tuning threshold associated with each initial thread (or each adjusted initial thread) may be identified based on the processing time. In 4109, the application program including five target threads may be obtained. In 4110, the five target threads may be tuned according to the five thread tuning thresholds, respectively. In some embodiments, to facilitate the thread tuning operation, various predetermined numbers of threads may be tested. For example, the predetermined numbers may include all integers from 2 to 8. That is, seven predetermined numbers of initial threads (or seven set of initial threads) may be obtained and/or tested, in which the first set of initial threads may include two initial threads, the second set of initial threads may include three initial threads, the seventh set of initial threads may include eight initial threads. In 4102, the processing time of the seven set of initial threads may be tested under one or more distribution modes in the parallel asynchronous processing time, respectively. In 4104, the processing time associated with the seven sets of initial threads may be adjusted under the target distribution mode according to the constraint rules, respectively. In 4106, the seven sets of initial threads that satisfy the constraint rules after adjustment may be obtained as seven sets of adjusted initial threads, respectively. In 4108, the processing time of each adjusted initial thread of each set of adjusted initial thread may be determined in a single thread mode, and/or a thread tuning threshold associated with each initial thread (or each adjusted initial thread) may be identified based on the processing time, respectively. Therefore, seven sets of thread tuning thresholds may be obtained. If an application program including four target threads is obtained in 4109, and in the thread tuning in 4110, no new thread is added, then in 4110, the four target threads may be tuned according to a corresponding set of thread tuning thresholds that include four thread tuning thresholds. If an application program including four target threads is obtained in 4109, and in the thread tuning in 4110, a new thread is added, then in 4110, five target threads may be tuned according to a corresponding set of thread tuning thresholds that include five thread tuning thresholds.

According to the process for thread tuning described above, the thread tuning threshold may be determined according to the processing time of each adjusted initial thread in the single thread mode, and the processing time may be adjusted under the distribution mode with the lowest load performance, and based on constraint rule(s). The performances of the distribution modes and the situation that a plurality of threads may compete for the CPU cores may be considered. Therefore, the thread tuning threshold(s) may represent the most appropriate processing time of the thread(s), and can serve as performance parameter(s) for thread tuning. In the subsequent design of multi-threaded application(s), for example, an application including three threads (such as threads A, B, C), according to the operations 4102 through 4110, the thread tuning thresholds may be used, respectively, as the tuning criterion of the three threads (A, B, C). If the processing time of a thread is larger than the thread tuning threshold determined in 4108, the thread may need to be tuned to meet the thread tuning threshold, and then the tuned thread can be added to the designed application. The processing time of a thread can be directly compared with corresponding thread tuning threshold, and thus, unnecessary repeated tuning can be eliminated, and accordingly, the processing efficiency of multi-thread tuning can be improved.

It should be noted that the above description of process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 4109 may be performed before 4101. As another example, operations 4101 and 4109 may be integrated into a single operation. As a further example, operations 4101 and/or 4109 may be omitted.

Figure 5:
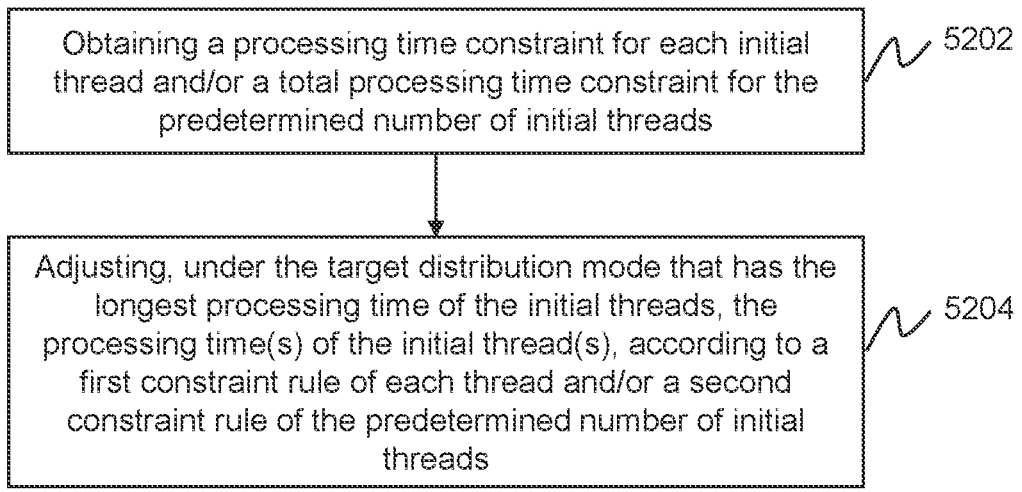
FIG. 5 is a flowchart illustrating an exemplary process for adjusting the processing time(s) of the initial thread(s) according to some embodiments of the present disclosure.

FIG. 5 is a flowchart illustrating an exemplary process for adjusting the processing time(s) of the initial thread(s) according to some embodiments of the present disclosure. In some embodiments, at least part of process 500 may be performed by the processing device 140 (implemented in, for example, the computing device 200 shown in FIG. 2). For example, the process 500 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140a illustrated in FIG. 7). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, operation 4104 illustrated in FIG. 4 may be performed according to the process 500.

In some embodiments, as shown in FIG. 5, an exemplary adjustment process of the processing time(s) associated with the initial thread(s) under the target distribution mode and according to the constraint rules is provided. The process 500 may include one or more of the following operations:

In 5202, one or more constraint rules may be obtained.

In some embodiments, the processing device 140 (e.g., the adjustment module 7404) may perform operation 5202. In some embodiments, in 5202, a processing time constraint for each initial thread and/or a total processing time constraint for the predetermined number of initial threads may be obtained. In some embodiments, the processing time constraint for each initial thread may be associated with a first upper limit value. In some embodiments, the total processing time constraint for the predetermined number of initial threads may be associated with a second upper limit value.

In some embodiments, exemplary constraint rule(s) may include a first constraint associated with the processing time of a thread (e.g., each thread) of the predetermined number of initial threads, and/or a second constraint associated with the total processing time of the predetermined number of initial threads in the parallel asynchronous processing mode.

Specifically, in some embodiments, obtaining the constraint rule(s) may include obtaining the processing time of a thread (e.g., each thread) of the predetermined number of initial threads, and/or the total processing time of the predetermined number of initial threads in the parallel asynchronous processing mode. That is, a first upper limit value of the processing time of a thread (e.g., each thread) of the predetermined number of initial threads and/or a second upper limit value of the total processing time of the predetermined number of initial threads may be obtained. In some embodiments, the constraint rule(s) may be set according to one or more application requirements.

In 5204, the processing time of a thread (e.g., each thread) of the predetermined number of initial threads may be adjusted, under the target distribution mode, according to the first constraint (rule) until the total processing time of the predetermined number of initial threads satisfies the second constraint (rule).

In some embodiments, the processing device 140 (e.g., the adjustment module 7404) may perform operation 5204. In some embodiments, the processing time(s) of the initial thread(s) may be adjusted according to the first constraint and/or the second constraint.

In some embodiments, according to the first constraint associated with the processing time of a thread (e.g., each thread) of the predetermined number of initial threads, the processing time of a thread (e.g., each thread) of the predetermined number of initial threads may need to be less than or equal to a threshold. According to the second constraint associated with the total processing time of the predetermined number of initial threads, the total processing time of the predetermined number of initial threads may need to be less than or equal to another threshold.

Specifically, in some embodiments, under the target distribution mode, the processing time of a thread (e.g., each thread) of the predetermined number of initial threads may be adjusted according to a first upper limit value of the processing time of the thread, and accordingly, the processing time of the thread may not exceed the first upper limit value of the processing time of the thread. After the predetermined number of initial threads are adjusted, the total processing time of the predetermined number of initial threads may be tested, under the target distribution mode, in the parallel asynchronous processing mode. The total processing time may be associated with the predetermined number of initial threads. If the total processing time satisfies the second constraint, i.e., the total processing time associated with the predetermined number of initial threads is less than or equal to the second upper limit value of the total processing time, then the predetermined number of threads that have been adjusted and satisfy the constraint rule(s) may be obtained as the adjusted initial threads.

For example, in some embodiments, if there are two initial threads, the first upper limit value of the processing time associated with each initial thread is 50 ms, and the second upper limit value of the total processing time associated with the predetermined number of initial threads is 150 ms under the even distribution mode. The example is merely provided for the purposes of illustration, and not intended to limit the scope of the present disclosure. Because the processing time constraint associated with each thread is 50 ms, first, the processing time of the two initial threads may be adjusted to the first upper limit value of 50 ms according to the first constraint. That is, the processing time of 50 ms may be allocated to each of the two initial threads. The two threads may be executed in the parallel asynchronous mode to obtain the total processing time. If the total processing time is less than or equal to 150 ms, the two threads each of which having a processing time that is adjusted to 50 ms may be obtained the adjusted initial threads that satisfy the constraint rule(s). If the total processing time is larger than 150 ms, the total processing time may not meet the second upper limit value of 150 ms according to the total processing time constraint associated with the predetermined number of initial threads. Therefore, the processing times associated with the two threads may need to be further adjusted. Because the total processing time is larger than the second upper limit value of 150 ms of the total processing time constraint associated with the predetermined number of initial threads, the processing time allocated to the two threads may be adjusted downward to, for example, 45 ms. It may be further determined whether the total processing time associated with the predetermined number of threads meets the second upper limit value of 150 ms in the parallel asynchronous mode after the processing time of each thread is adjusted to 45 ms. If the total processing time meets the second upper limit value, the processing time adjustment may be completed. If the total processing time does not meet the second upper limit value, the processing time adjustment may be performed again until the total processing time meets the second upper limit value.

In some embodiments, if the total processing time is less than 150 ms after the processing time associated with the two threads is adjusted to 45 ms, the processing time associated with the two threads may be further adjusted upward from 45 ms. It may be determined whether the total processing time meets the second upper limit value of 150 ms if the processing time associated with the two threads is larger than 45 ms. That is, the processing time(s) of the thread(s) may be adjusted, so that the processing time of each thread is close to the first upper limit value of the processing time associated with the thread, and the total processing time is close to the second upper limit value of the total processing time associated with the two threads as much as possible. The upper limit value (e.g., the first upper limit value, and/or the second upper limit value) may be predetermined according to actual application requirements. In some embodiments, the maximum processing load of the thread(s) may be considered, The predetermined first and second upper limit values (e.g., 50 ms and 150 ms, respectively) may indicate the processing time of the maximum processing load that the CPU can load. Therefore, if the processing times associated with the predetermined number of threads are adjusted close to the predetermined first and second upper limit values as much as possible, the maximum processing load of the CPU may be ensured as much as possible, and accordingly, the maximum processing load of the CPU may be prevented from being reduced in subsequent tuning operations.

Figure 6:
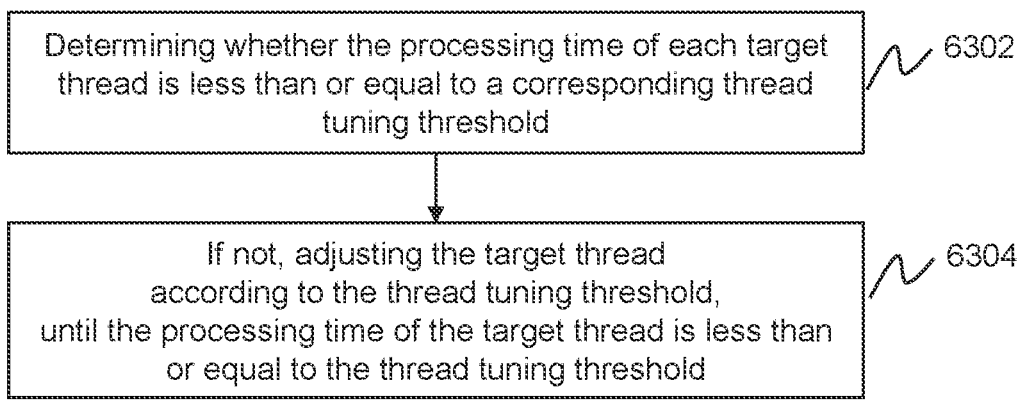
FIG. 6 is a flowchart illustrating an exemplary process for thread tuning according to some embodiments of the present disclosure.

FIG. 6 is a flowchart illustrating an exemplary process for thread tuning according to some embodiments of the present disclosure. In some embodiments, at least part of process 600 may be performed by the processing device 140 (implemented in, for example, the computing device 200 shown in FIG. 2). For example, the process 500 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140*a* illustrated in FIG. 7). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 4110 illustrated in FIG. 4 may be performed according to the process 600.

In some embodiments, as shown in FIG. 6, an exemplary thread tuning process based on one or more thread tuning thresholds is provided. The process 600 may include one or more of the following operations:

In 6302, it may be determined whether the processing time associated with a target thread (e.g., each target thread) is less than or equal to a corresponding thread tuning threshold.

In some embodiments, the processing device 140 (e.g., the tuning module 7410) may perform operation 6302. In some embodiments, as illustrated above, each target thread may correspond to an initial thread (or an adjusted initial thread), and each initial thread (or adjusted initial thread) may correspond to a thread tuning threshold.

Therefore, each target thread may correspond to a thread tuning threshold, i.e., each target thread may have a corresponding thread tuning threshold. The thread tuning thresholds for different target threads may be the same or different.

Specifically, in some embodiments, a thread tuning threshold may refer to the processing time constraint associated with a thread (e.g., each thread) in the single thread mode. In a multi-threaded application, if the processing time(s) associated with the thread(s) of the multi-threaded application are larger than the corresponding thread tuning threshold(s), the thread(s) may need to be tuned, Therefore, it may be determined whether the processing time associated with a target thread (e.g., each target thread) is less than or equal to the corresponding thread tuning threshold.

In 6304, if not (i.e., the processing time of the target thread is larger than the corresponding thread tuning threshold), the processing time of the target thread may be adjusted according to the thread tuning threshold, until the processing time is less than or equal to the thread tuning threshold.

In some embodiments, the processing device 140 (e.g., the tuning module 7410) may perform operation 6304. More descriptions of the thread tuning operation may be found elsewhere in the present disclosure (e.g., FIG. 4 and descriptions thereof).

Specifically, in some embodiments, if it is determined that the processing time of the target thread is larger than the thread tuning threshold, the processing time associated with the target thread may be adjusted until the thread tuning threshold is met. That is, the target thread can be actually used in the application only when the processing time of the target thread is less than or equal to the thread tuning threshold.

It should be noted that the above description of process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. Although the thread tuning operation for only one target thread is illustrated in FIG. 6, any other target thread of a multi-threaded application can be tuned similarly as illustrated in FIG. 6.

In some embodiments, the one or more distribution modes described in the present disclosure may include, but not limited to, the following three types: a first distribution mode based on an even allocation of the total processing time (among the threads), a second distribution mode based on an allocation from small to large of the total processing time (among the threads), a third distribution mode based on an allocation from large to small of the total processing time (among the threads). For any distribution mode, in the thread tuning of threads of a multi-threaded application, the time allocation for each thread may be considered in the single thread mode. Therefore, the total time allocation for the predetermined number of threads may be the same as the total processing time of the predetermined number of threads. Before testing of the processing time(s), the processing time may be allocated to each thread according to one or more distribution modes. The testing of the processing time(s) may be performed in a multi-thread parallel asynchronous processing mode. The processing time(s) associated with the thread(s) in the multi-thread parallel asynchronous processing mode may be different from the processing time(s) in the single thread mode. Therefore, it may be desirable to determine the processing time of each thread in one or mode distribution modes, separately.

For example, if the total processing time is 100 ms for four threads (e.g., thread 1, thread 2, thread 3, thread 4) that are processed individually, in the first distribution mode, the processing time allocated to each thread may be 25 ms. In the second distribution mode, the total processing time may be allocated from small to large among the four threads. For example, thread 1 may be allocated with 10 ms of the total processing time, thread 2 may be allocated with 20 ms of the processing time, thread 3 may be allocated with 30 ms of the processing time, and thread 4 may be allocated with 40 ms of the processing time. In the third distribution mode, the processing time may be allocated from large to small among the four threads. For example, thread 1 may be allocated with 40 ms of the processing time, thread 2 may be allocated with 30 ms of the processing time, thread 3 may be allocated with 20 ms of the processing time, and thread 4 may be allocated with 10 ms of the processing time.

According to the one or more distribution modes, the processing time(s) of the thread(s) may be tested in the one or more distribution modes, and the load performance of the thread(s) may be determined according to the processing time(s) of the thread(s) in the one or more distribution modes. The thread(s) under the target distribution mode corresponding to the longest processing time may have the lowest load performance. During the execution of an application program, the processing time(s) of the thread(s) may fluctuate. If the distribution mode associated with the lowest load performance can meet the requirements of the system (e.g., the image processing system 100), other distribution modes may also meet the requirements of the system. Therefore, by testing the load performance under one or more distribution modes, the distribution mode associated with the lowest load performance may be selected and the thread tuning threshold(s) may be determined under the target distribution mode associated with the lowest load performance, thereby ensuring that the thread tuning threshold(s) can be applied to any one of the distribution modes in actual operation.

In some embodiments, in order to test the load performance of a thread (e.g., each thread) under the one or more distribution modes, at least two of the three distribution modes (e.g., the first distribution mode, the second distribution mode, the third distribution mode) may be selected.

According to the process(es) as illustrated above, because the thread tuning threshold(s) are determined according to the processing time(s) associated with the adjusted thread(s) in the single thread mode, and the processing time(s) are determined based on the target distribution mode (corresponding to the longest processing time) and the constraint rule(s), the performance of the distribution modes and the situation that a plurality of threads compete for the core(s) (of the CPU) can be considered in the thread tuning operation. Therefore, the thread tuning threshold(s) may represent the most appropriate processing time(s) of the thread(s), and may serve as a performance parameter for thread tuning. In the subsequent design of multi-threaded applications, the thread tuning threshold(s) may be used as the tuning criteria. If the processing time associated with a thread is larger than a corresponding thread tuning threshold, the thread may need to be tuned to meet the thread tuning threshold, and may be added to the designed application when the thread tuning threshold is met. By directly comparing with the thread tuning threshold, unnecessary repeated thread tuning operation may be avoided, and the processing efficiency of multi-thread tuning may be improved.

It may be understood that although the various operations in the flowcharts of FIGS. 4-6 are displayed successfully as indicated by the arrows, these operations are not necessarily performed in the order indicated by the arrows. Except as explicitly stated herein, there is no strict ordering of the execution of these operations, and these operations can be performed in other orders. Moreover, at least a portion of the operations in FIGS. 4-6 may include a plurality of sub-operations or a plurality of stages. These sub-operations or stages are not necessarily performed at the same time, but may be executed at different times. The execution order of these sub-operations or stages is also not necessarily successful, but may be performed alternately or alternately with other operations or at least a portion of sub-operations or stages of other operations.

Figure 7:
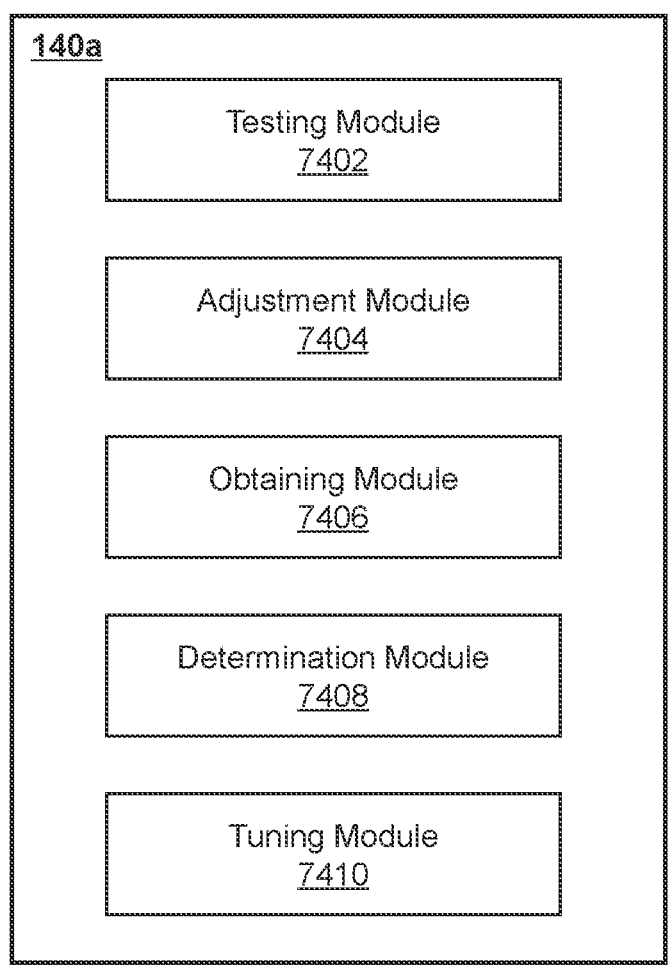
FIG. 7 is a block diagram illustrating an exemplary processing device according to some embodiments of the present disclosure.

FIG. 7 is a block diagram illustrating an exemplary processing device according to some embodiments of the present disclosure. In some embodiments, the processing device 140a may be a thread tuning device.

In some embodiments, as shown in FIG. 7, a thread tuning device is provided. The thread tuning device may include a testing module 7402, an adjustment module 7404, an obtaining module 7406, a determination module 7408, and a tuning module 7410.

The testing module 7402 may be configured to test processing time(s) associated with the initial thread(s) under one or more predetermined distribution modes in the parallel asynchronous processing mode.

The adjustment module 7404 may be configured to adjust the processing time(s) associated with the initial thread(s) under a target distribution mode, and/or according to one or more constraint rules.

In some embodiments, the adjustment module 7404 may obtain one or more constraint rules. In some embodiments, the adjustment module 7404 may adjust the processing time of a thread (e.g., each thread) of the predetermined number of initial threads, under the target distribution mode, according to the first constraint (rule) until the total processing time of the predetermined number of initial threads satisfies the second constraint (rule).

The obtaining module 7406 may be configured to obtain the predetermined number of initial thread(s) that satisfy the constraint rule(s) after adjustment as adjusted initial thread(s).

In some embodiments, the obtaining module 7406 may obtain the predetermined number of initial threads. In some embodiments, the obtaining module 7406 may obtain an application program.

The determination module 7408 may be configured to determine a processing time associated with each adjusted initial thread under a single thread mode, and/or identify a thread tuning threshold associated with each initial thread (or each adjusted initial thread) according to the processing time.

The tuning module 7410 may be configured to tune the target thread(s) according to the thread tuning threshold(s).

In some embodiments, the testing module 7402 may include a rule obtaining sub-module and/or a processing time adjustment sub-module. The rule obtaining sub-module may be configured to obtain a first constraint associated with the processing time of a thread (e.g., each thread) of the predetermined number of initial threads, and/or a second constraint associated with the total processing time of the predetermined number of initial threads in the parallel asynchronous processing mode. The processing time adjustment sub-module may be configured to adjust the processing time of a thread (e.g., each thread) of the predetermined number of initial threads according to the first constraint until the total processing time of the predetermined number of initial threads satisfies the second constraint.

In some embodiments, the tuning module 7410 may be further configured to determine whether the processing time associated with a target thread (e.g., each target thread) is less than or equal to a corresponding thread tuning threshold. If not, the tuning module 7410 may adjust the processing time of the target thread according to thread tuning threshold until the processing time is less than or equal to the thread tuning threshold.

According to the process(es) and the device(s) as illustrated above, because the thread tuning threshold(s) are determined according to the processing time(s) associated with the adjusted thread(s) in the single thread mode, and the processing time(s) are determined based on the target distribution mode (corresponding to the longest processing time) and the constraint rule(s), the performance of the distribution modes and the situation that a plurality of threads compete for the core(s) (of the CPU) can be considered in the thread tuning operation. Therefore, the thread tuning threshold(s) may represent the most appropriate processing time(s) of the thread(s), and may serve as a performance parameter for thread tuning. In the subsequent design of multi-threaded applications, the thread tuning threshold(s) may be used as the tuning criteria. If the processing time associated with a thread is larger than a corresponding thread tuning threshold, the thread may need to be tuned to meet the thread tuning threshold, and may be added to the designed application when the thread tuning threshold is met. By directly comparing with the thread tuning threshold, unnecessary repeated thread tuning operation may be avoided, and the processing efficiency of multi-thread tuning may be improved.

For specific definitions of the thread tuning device, reference may be made to the definition of the thread tuning method illustrated above, and details are not repeated herein. The various modules in the thread tuning device can be implemented in whole or in part by software, hardware, or any combination thereof. The modules may be embedded in or independent of the processor in the computing device, or may be stored in the storage in the computing device in the form of software, so that the processor may call to execute the operations corresponding to the above modules.

Figure 8:
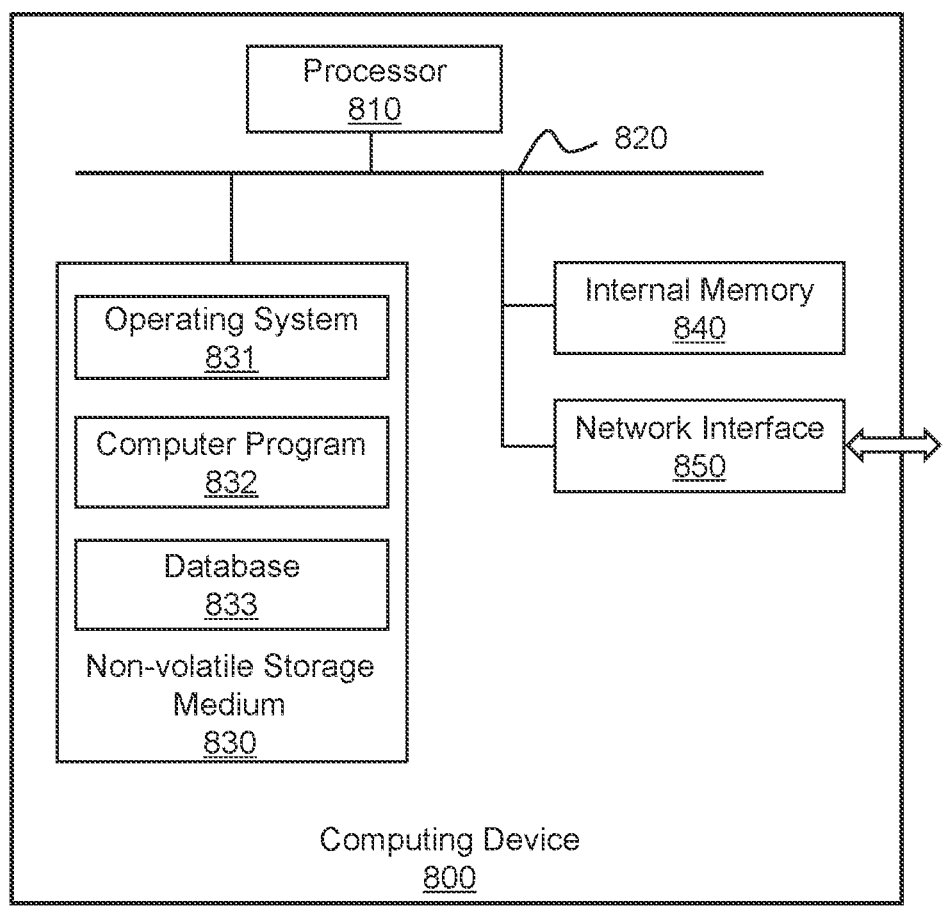
FIG. 8 is a diagram illustrating an exemplary computing device according to some embodiments of the present disclosure.

FIG. 8 is a diagram illustrating an exemplary computing device according to some embodiments of the present disclosure.

In some embodiments, a computing device 800 is provided. The computing device 800 may be a server, and its internal components may be shown in FIG. 8. The computing device 800 may include a processor 810, a storage, a network interface 850, and a database 833 connected through a system bus 820. The processor 810 of the computing device 800 may be configured to provide computing and/or control capabilities. The storage of the computing device 800 may include a non-volatile storage medium 830, and an internal memory 840. The non-volatile storage medium 830 may store an operating system 831, computer program(s) 832, and the database 833. The internal memory 840 may provide an environment for the operation of the operating system 831 and the computer program(s) 832 in the non-volatile storage medium 830. The database 833 of the computing device 800 may be configured to store data associated with thread tuning (e.g., the thread tuning threshold(s)). The network interface 850 of the computing device 800 may be configured to communicate with an external terminal through a network connection. The computer program(s) 832 may be executed by the processor 810 to implement the thread tuning method.

It will be understood by those skilled in the art that the structure shown in FIG. 8 is merely a block diagram of a part of the structure related to the present disclosure, and does not constitute a limitation on the computing device to which the present disclosure scheme is applied. The computing device may include more or fewer components than those shown in the figures, or some components may be combined, or have different component arrangements.

In some embodiments, a computing device including a storage and a processor may be provided. The storage may store a computer program. The processor may implement one or more of the following operations when executing the computer program. A predetermined number of initial threads may be obtained. Processing time(s) of the initial thread(s) may be tested, under one or more distribution modes, in a parallel asynchronous processing mode. A longest processing time corresponding to a target distribution mode of the one or more distribution modes may be determined. The processing time(s) associated with the initial thread(s) may be adjusted, based on one or more constraint rules, under the target distribution mode in the parallel asynchronous processing mode. The processing time for each adjusted initial thread may be determined in a single thread mode. A thread tuning threshold associated with each initial thread (or each adjusted initial thread) may be identified based on the processing time. An application program including a plurality of target threads may be obtained. Each target thread may be tuned under the single thread mode based on the corresponding thread tuning threshold.

In some embodiments, the processor may also implement one or more of the following operations when executing the computer program. Constraint rule(s) may be obtained. The processing time of a thread (e.g., each thread) of the predetermined number of initial threads may be adjusted according to the first constraint until the total processing time of the predetermined number of initial threads satisfies the second constraint.

In some embodiments, the processor may also implement one or more of the following operations when executing the computer program. Whether the processing time associated with each target thread is less than or equal to a corresponding thread tuning threshold may be determined. If not, the processing time of the target thread may be adjusted according to the thread tuning threshold until the processing time is less than or equal to the thread tuning threshold.

In some embodiments, a computer readable non-volatile storage medium storing instructions is provided. The instructions, when executed by the processor, may cause the processor to implement one or more of the following operations. A predetermined number of initial threads may be obtained. Processing time(s) of the initial thread(s) may be tested, under one or more distribution modes, in a parallel asynchronous processing mode. A longest processing time corresponding to a target distribution mode of the one or more distribution modes may be determined. The processing time(s) associated with the initial thread(s) may be adjusted, based on one or more constraint rules, under the target distribution mode in the parallel asynchronous processing mode. The processing time for each adjusted initial thread may be determined in a single thread mode. A thread tuning threshold associated with each initial thread (or each adjusted initial thread) may be identified based on the processing time. An application program including a plurality of target threads may be obtained. Each target thread may be tuned under the single thread mode based on the corresponding thread tuning threshold.

In some embodiments, the instructions, when executed by the processor, may cause the processor to further implement one or more of the following operations. Constraint rule(s) may be obtained. The processing time of a thread (e.g., each thread) of the predetermined number of initial threads may be adjusted according to the first constraint until the total processing time of the predetermined number of initial threads satisfies the second constraint.

In some embodiments, the instructions, when executed by the processor, may cause the processor to further implement one or more of the following operations, Whether the processing time associated with each target thread is less than or equal to a corresponding thread tuning threshold may be determined. If not, the processing time of the target thread may be adjusted according to the thread tuning threshold until the processing time is less than or equal to the thread tuning threshold.

Figure 9:
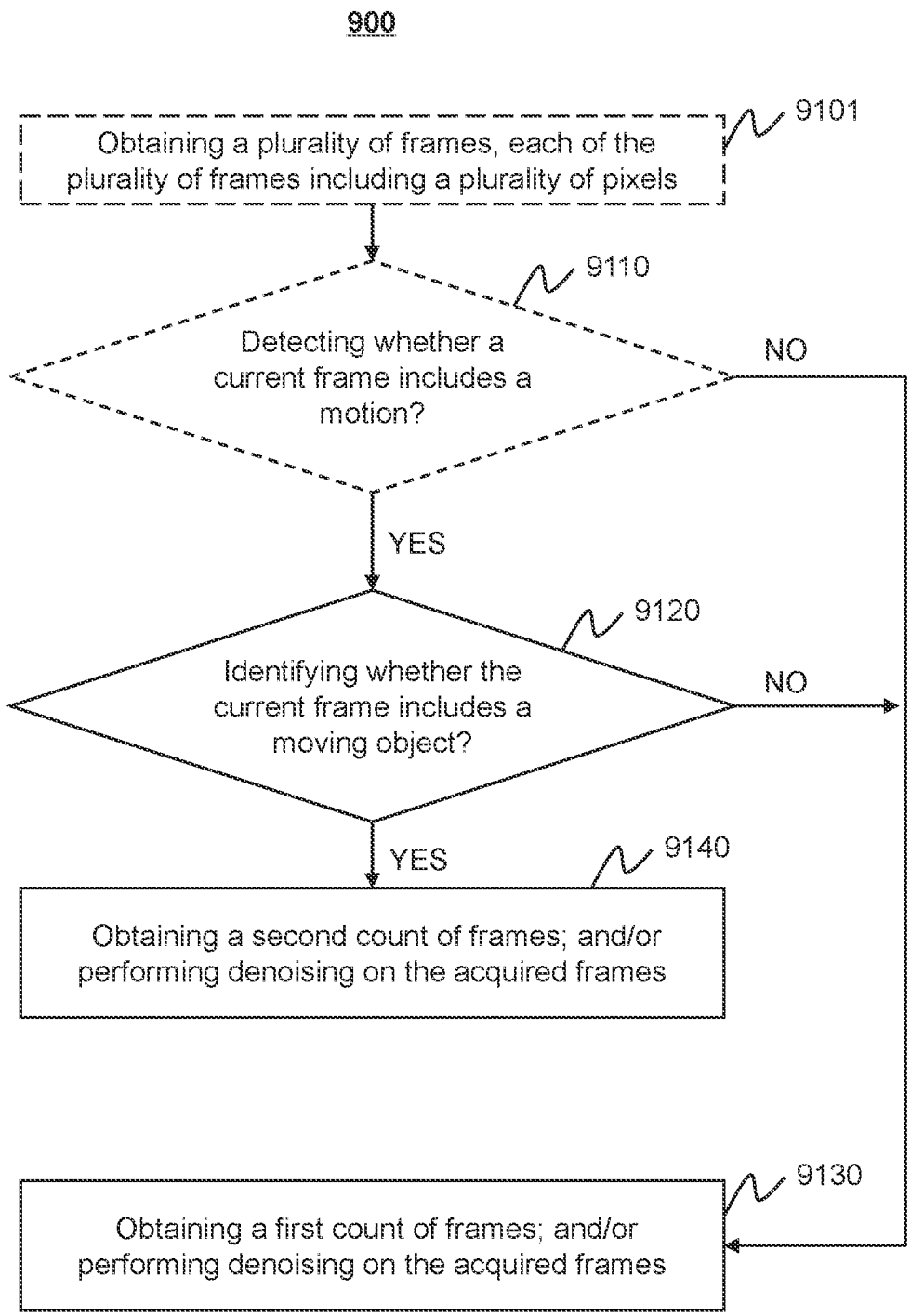
FIG. 9 is a flowchart illustrating an exemplary process for image processing according to some embodiments of the present disclosure.

FIG. 9 is a flowchart illustrating an exemplary process for image processing according to some embodiments of the present disclosure. In some embodiments, the image processing operations may be performed by a computing device (e.g., the computing device 200, the computing device 1500, or the like). In some embodiments, the computing device may be a terminal 130, or may be a server. As shown in FIG. 9, the image processing process may include one or more of the following operations.

In some embodiments, at least part of process 900 may be performed by the processing device 140 (implemented in, for example, the computing device 200 shown in FIG. 2). For example, the process 900 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3. or one or more modules in the processing device 140*b* illustrated in FIG. 14). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 9101, a plurality of frames may be obtained. In some embodiments, the processing device 140 (e.g., the image acquisition module 14610) may perform operation 9101. In some embodiments, data associated with the plurality of frames may be generated by the scanner 110, the data may be transmitted to the processing device 140, and the processing device 140 may obtain the plurality of frames based on the data. In some embodiments, each of the plurality of frames may include a plurality of pixels. In some embodiments, each pixel may have a value (e.g., a grey level). In the present disclosure, "frame," "image," and "image frame" are used interchangeably. In some embodiments, a frame may be a fluoroscopic image.

In 9110, whether a current frame of the plurality of frames includes a motion may be detected.

In some embodiments, the processing device 140 (e.g., the scanning module 14620) may perform operation 9110.

The current frame may be an image acquired by an image acquisition device (e.g., the scanner 110). In some embodiments, the scanner 110 may collect data associated with a target object or a target region thereof and obtain the current frame. In some embodiments, the target object and/or the target region may be selected according to one or more detection needs. For example, the target object and/or the target region may be determined by the image processing system 100, or may be preset by a user or operator via the terminal(s) 130. In some embodiments, if the computing device that performs image processing operations serves an imaging device, the current frame may be obtained by the imaging device. In some embodiments, the image(s) to be processed may be fluoroscopic image(s). In some embodiments, the image(s) may include an X-ray image (also referred to as an X-ray fluoroscopic image). In some embodiments, the X-ray image may be acquired by a C-arm X-ray machine.

In some embodiments, in detecting whether the current frame of the plurality of frames includes a motion, the current frame may be compared with one or more previous frames, and accordingly whether the current frame of the plurality of frames includes a motion may be determined according to the comparison result (e.g., a difference between the current frame and the previous frame(s) (also referred to as an inter-frame difference)). In some embodiments, the comparison may be performed based on an inter-frame difference algorithm. Specifically, in some embodiments, the number (or count) of previous frames that need to be used for comparison (with the current frame) may be determined according to the inter-frame difference algorithm actually used. For example, if a general inter-frame difference algorithm is used, two frames may be used for comparison, that is, the current frame may be compared with one previous frame. If a three-frame difference algorithm is used, three frames may be used for comparison, that is, the current frame may be compared with two previous frames. In comparison process, the grey level of each pixel of the current frame may be directly compared with the grey level of a corresponding pixel in one or more previous frames (or one or more predetermined frames). That is, a grey level difference between a grey level of each pixel of the current frame and a grey level of a corresponding pixel of a previous frame may be determined. In some embodiments, the position of the each pixel of the current frame and the position of the corresponding pixel of the previous frame(s) may be the same. In some embodiments, whether the current frame of the plurality of frames includes a motion may be determined according to the grey level difference obtained through the comparison. In some embodiments, in determining whether or not the current frame of the plurality of frames includes a motion, an image scanning may be performed to traverse all the pixels of the image (e.g., the current frame, and/or the previous frame(s)).

In some embodiments, a previous frame may be obtained prior to the current frame. In some embodiments, the previous frame may be adjacent to the current frame. In some embodiments, there may be one or more frames between the previous frame and the current frame. For example, ten frames (e.g., frame 1, frame 2, frame 3, . . . , frame 10) are obtained in sequence, and frame 10 is the current frame, then the previous frame may be frame 9, or frame 8, or any other frame obtained prior to the current frame. More descriptions of the determination of whether the current frame of the plurality of frames includes a motion may be found elsewhere in the present disclosure (e.g., FIG. 10 and the descriptions thereof).

If it is detected that the current frame includes a motion, the process may proceed to operation 9120, otherwise the process may proceed to operation 9130.

In 9120, whether the current frame of the plurality of frames includes a moving object may be determined (or identified).

In some embodiments, the processing device 140 (e.g., the tracing module 14630) may perform operation 9120. In some embodiments, the current frame may be the last frame of the plurality of frames. In some embodiments, the current frame may be any frame of the plurality of frames.

In some embodiments, if it is determined that the current frame includes a motion, whether the current frame of the plurality of frames includes a moving object may be further determined. In some embodiments, whether the current frame includes a motion may be detected based on inter-frame difference(s) in 9110, and whether the current frame includes a moving object may be identified in 9120. The identification operation in 9120 may reduce the possibility of false detection, and ensure that a target image generated based on one or more collected frames have a relatively high clarity. In determining whether the current frame includes a moving object, a (determined) moving object in the previous frame may be matched in the current frame, and a position of the moving object in the current frame may be determined. In some embodiments, a position variation of the moving object may be determined based on the position of the moving object in the current frame and the position of the moving object in the previous frame. In some embodiments, whether the current frame includes a moving object may be determined based on the position variation of the moving object in the current frame and the previous frame. In some embodiments, the previous frame may include one or more (e.g., 1, 2, 3, etc.) moving objects. If there are two or more moving objects in the previous frame, each moving object may be matched in the current frame (similarly as illustrated above), and whether the moving object is still a moving object in the current frame may be determined according to a respective position variation. If it is determined that there is at least one moving object in the current frame, it may be determined that the current frame of the plurality of frames includes a moving object, and the process may proceed to operation 9140. If it is determined that there is no moving object in the current frame, then the process may proceed to operation 9130.

Figure 11:
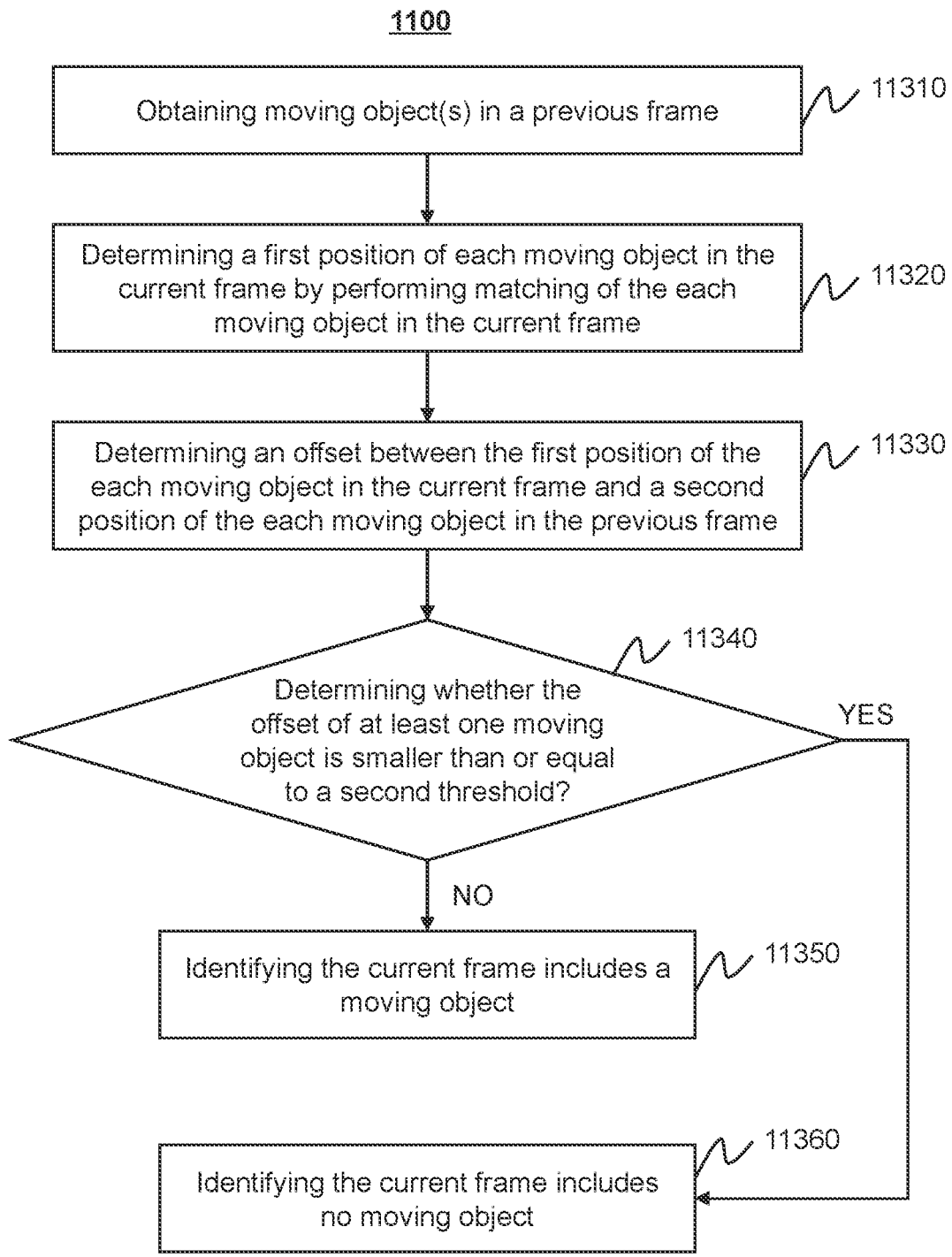
FIG. 11 is a flowchart illustrating an exemplary process for determining whether the current frame includes a moving object according to some embodiments of the present disclosure.

More descriptions of the determination of whether the current frame includes a moving object may be found elsewhere in the present disclosure (e.g., FIG. 11 and the descriptions thereof).

In 9130, a first count of frames may be obtained, and/or a target image may be generated by superimposing the first count of frames.

In some embodiments, the processing device 140 (e.g., the blur removal module 14640) may perform operation 9130. In some embodiments, a denoising operation may be performed on the acquired frame(s). In some embodiments, the first count of frames may be obtained (e.g., selected) from the pluraliry of frames obtained in 9101. In some embodiments, the first count of frames may be acquired (e.g., posterior to the pluraliry of frames obtained in 9101, or the current frame) at a first frame rate. In some embodiments, a first portion of the first count of frames may be obtained from the pluraliry of frames obtained in 9101, and a second portion of the first count of frames may be acquired at the first frame rate. In some embodiments, at least a portion or all of the first count of frames may be obtained from the pluraliry of frames obtained in 9101. The first count of frames may be at a consistent frame rate or variable frame rate. In some embodiments, the frame rate(s) of the first portion of the first count of frames may be the same as or different from the first frame rate. In some embodiments, at least a portion of the first count of frames may be obtained (or generated) posterior to the current frame. In some embodiments, at least a portion of the first count of frames may be acquired in real time (e.g., from the image acquisition module 14610) at the first frame rate after the current frame is obtained, For example, the plurality of frames obtained in 9101 include ten frames (e.g., frame 1, frame 2, frame 3, . . . , frame 10), the ten frames are obtained in sequence, and frame 10 is the current frame, then the first count of frames may be acquired in real time at the first frame rate and may include frame 11, frame 12, . . . , frame x, etc. Additionally, or alternatively, at least a portion of the first count of frames may be extracted from the plurality of frames. For example, the plurality of frames obtained in 9101 include 100 frames (e.g., frame 1, frame 2, frame 3, . . . , frame 100), the 100 frames are obtained in sequence, and frame 10 is the current frame, then the first count of frames may be extracted from the plurality of frames and may include, e.g., frame 2, frame 3, frame 8, frame 9, frame 13, frame 15, . . . , frame y, etc.

In some embodiments, the denoising operation may be implemented by superimposing the first count of frames, and the generated target image may have a relatively low level of noise, and may meet application requirements. In some embodiments, the superimposing operation may refer to a weighted averaging operation of the values of corresponding pixels of two or more frames (e.g., the first count of frames).

For example, if the first count of frames include three frames (e.g., frame A, frame B, frame C), then a weighted averaging may be performed on the value of a pixel of frame A, the value of a corresponding pixel of frame B, and the value of a corresponding pixel of frame C to obtain the value of a corresponding pixel of the target image. In some embodiments, the pixel of frame A, the corresponding pixel of frame B, the corresponding pixel of frame C, and the corresponding pixel of the target image may have the same position.

In 9140, a second count of frames may be obtained, and/or a target image may be generated by superimposing the second count of frames.

In some embodiments, the processing device 140 (e.g., the blur removal module 14640) may perform operation 9140. In some embodiments, a denoising operation may be performed on the acquired frame(s). In some embodiments, the denoising operation may include the superimposing operation. In some embodiments, the second count of frames may be obtained (e.g., selected) from the plurality of frames obtained in 9101. In some embodiments, the second count of frames may be acquired (e.g., posterior to the plurality of frames obtained in 9101, or the current frame) at a second frame rate. In some embodiments, a first portion of the second count of frames may be obtained from the pluraliry of frames obtained in 9101, and a second portion of the second count of frames may be acquired at the second frame rate. In some embodiments, at least a portion or all of the second count of frames may be obtained from the plurality of frames obtained in 9101. The second count of frames may be at a consistent frame rate or variable frame rate. In some embodiments, the frame rate(s) of the first portion of the second count of frames may be the same as or different from the second frame rate. In some embodiments, at least a portion of the second count of frames may be obtained (or generated) posterior to the current frame. In some embodiments, at least a portion of the second count of frames may be acquired in real time (e.g., from the image acquisition module 14610) at the second frame rate after the current frame is obtained. Additionally, or alternatively, at least a portion of the second count of frames may be extracted from the plurality of frames.

In some embodiments, the fluoroscopic images obtained in real time may be superimposed for denoising, and thus, image noise may be reduced. In some embodiments, the denoising process may include a filtering process including, for example, Gaussian low pass filtering, bilateral filtering, mean filtering, nonlocal mean filtering, or the like, or a combination thereof. In some embodiments, the frame rate of frame acquisition (e.g., the first frame rate, and/or the second frame rate) may be related to the target object or the target region scanned by the image acquisition device. In some embodiments, the frame rate (e.g., the first frame rate, and/or the second frame rate) may be determined by the image processing system 100, or may be preset by a user or operator (according to the target object or the target region) via the terminal(s) 130. In some embodiments, the first frame rate may be set according to an empirical frame rate in the image denoising process, for example, less than 30 fps.

In some embodiments, the second frame rate may be larger than the first frame rate. That is, if a moving object is detected in the current frame, the frame rate may be increased, i.e., the time interval in the acquisition of two adjacent frames may be reduced. By reducing the time interval in the acquisition of two adjacent frames, the temporal resolution of image acquisition may be increased, motion blurs induced by the superimposing of two or more frames in the denoising process may be reduced, thereby reducing the motion artifact induced by moving object(s) in the image denoising process. If an image (e.g., the current frame) includes no moving object, a relatively low frame rate may be used in image acquisition, and thus, the dose delivered in image acquisition may be reduced. For example, if the current frame is acquired by an X-ray device, the X-ray dose may be lowered by using a relatively low frame rate when the image includes no moving object.

In some embodiments, the first count (and/or the second count) may be determined according to the target object or the target region scanned by the image acquisition device. That is, the first count (and/or the second count) may be variable for different target objects or target regions. In some embodiments, the first count (and/or the second count) may be determined by the image processing system 100, or may be preset by a user or operator (according to the target object or the target region) via the terminal(s) 130. In some embodiments, the first count and/or the second count may be positive integers. For example, the first count or the second count may be a value in the range of 1-32. In some embodiments, the second count may be less than the first count. That is, if it is detected that the current frame includes a moving object, a relatively small count of frames may be superimposed for denoising the target image. If the current frame includes a moving object, the superimposing of a relatively large count of frames may bring obvious motion artifacts. Therefore, the superimposing of a relatively small count of frames may ensure that the target image includes a relatively low level of noise or no noise, and accordingly, the clarity of the target image may be improved.

In some embodiments, if it is detected that the current frame includes a moving object, the frame rate and/or the count of frames used in the image acquisition process may be adjusted. In some embodiments, the frame rate may be increased and/or the count of images for superimposing may be decreased, so that the motion artifacts may be reduced or removed, and the target image may have a relatively high clarity. In some embodiments, the frame rate may be increased while the count of images acquired for superimposing may remain unchanged (or the count of framed acquired for superimposing may be decreased while the frame rate may remain unchanged), and accordingly, the artifacts may also be reduced or removed.

It should be noted that the above description of process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 9101 and/or 9110 may be omitted. In some embodiments, whether the current frame includes a moving object may be directly determined without detecting whether the current frame includes a motion. In some embodiments, after operation 9130 or 9140 is performed, a next frame posterior to the current frame may be designated as a new current frame, and the process may return to 9110. In some embodiments, before determining whether the current frame includes a moving object, whether the current frame includes a motion may be detected, so that the count of (current) frames used for the determination of whether the current frame includes a moving object may be decreased, and thus, the processing efficiency of the acquired image frames may be improved, and resources of the processing device 140 used in the image processing may be reduced.

Figure 10:
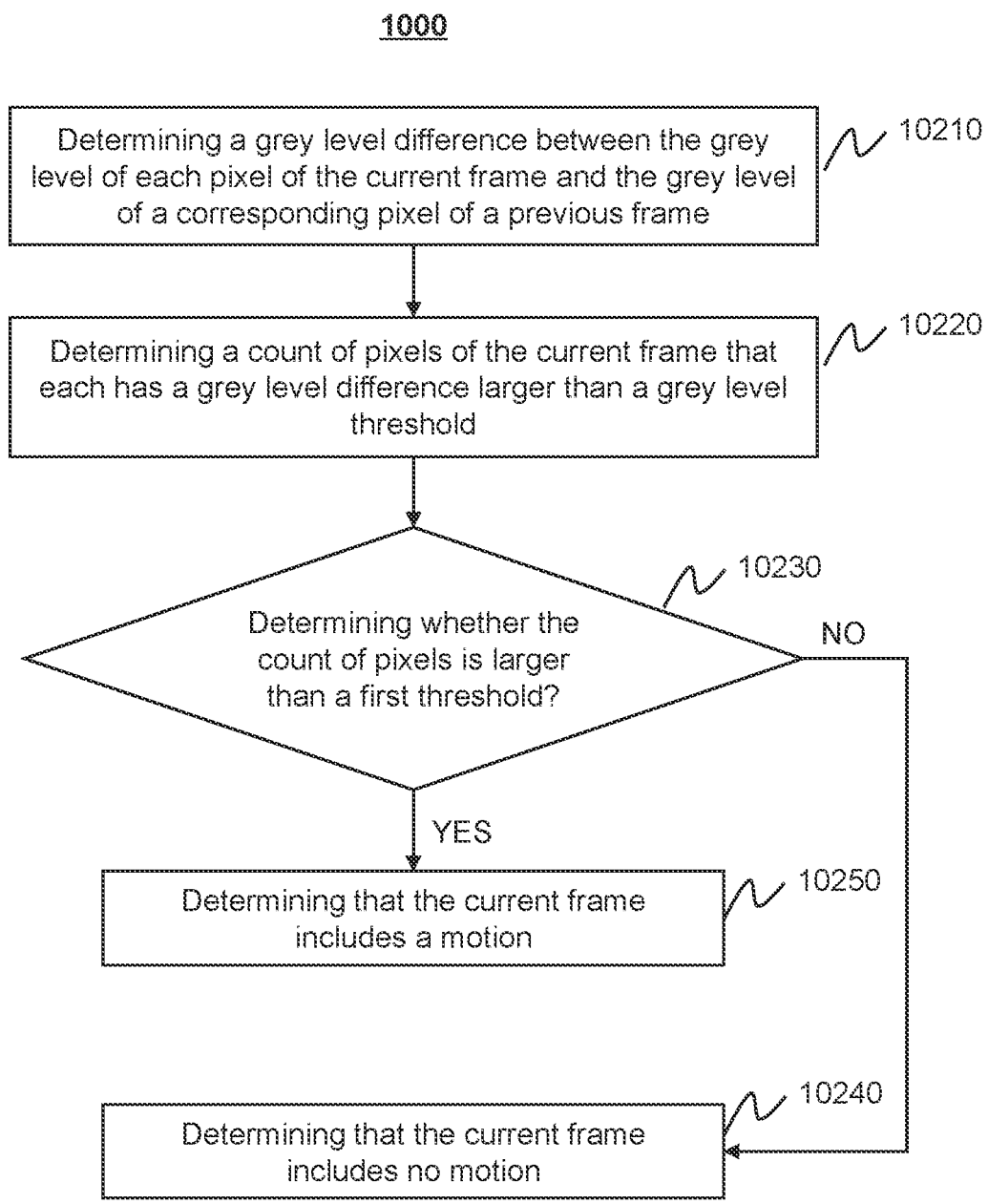
FIG. 10 is a flowchart illustrating an exemplary process for detecting whether a current frame includes a motion according to some embodiments of the present disclosure.

FIG. 10 is a flowchart illustrating an exemplary process for detecting whether a current frame includes a motion according to some embodiments of the present disclosure. In some embodiments, at least part of process 1000 may be performed by the processing device 140 (implemented in, for example, the computing device 200 shown in FIG. 2). For example, the process 1000 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140b illustrated in FIG. 14). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In some embodiments, operation 9110 illustrated in FIG. 9 may be performed according to the process 1000. The process 1000 may include one or more of the following operations:

In 10210, the grey level of each pixel in the current frame may be compared with the grey level of a corresponding pixel in one or more previous frames based on an inter-frame difference algorithm to obtain a grey level difference of the each pixel.

In some embodiments, the processing device 140 (e.g., the scanning module 14620) may perform operation 10210.

In some embodiments, the grey level of each pixel in the current frame may be compared with the grey level of a corresponding pixel in a previous frame to obtain a grey level difference of the each pixel. In some embodiments, the grey level difference of each pixel may be determined by comparing the grey level of each pixel in the current frame with the grey level of two or more previous frames according to the inter-frame difference algorithm.

In 10220, the count of pixels in the current frame that each has a grey level difference larger than a grey level threshold may be determined.

In some embodiments, the processing device 140 (e.g., the scanning module 14620) may perform operation 10220. The grey level threshold may be determined by the image processing system 100, or may be preset by a user or operator via the terminal(s) 130.

In some embodiments, the grey level threshold may be a grey level within the noise range of the plurality of frames. In some embodiments, if the current frame has no motion (relative to the previous frame), the grey level difference of the pixels in the corresponding positions in the two frames (e.g., the current frame and the previous frame) may be substantially consistent or basically the same. Therefore, if the grey level difference of a pixel is larger than the grey level threshold, it may be determined that the pixel moves relative to the corresponding pixel of the same position in the previous frame. In sortie embodiments, the count of pixels that move relative to the previous frame may be determined. In some embodiments, whether the current frame includes a motion may be determined according to the count of pixels that move relative to the previous frame.

In 10230, whether the count of pixels is larger than a first threshold may be determined.

In some embodiments, the processing device 140 (e.g., the scanning module 14620) may perform operation 10230.

If the count of pixels that each has a grey level difference larger than the grey level threshold is larger than the first threshold, it may be determined that the current frame includes a motion. The first threshold may be determined by the image processing system 100, or may be preset by a user or operator via the terminal(s) 130. In some embodiments, the first threshold may be obtained according to one or more factors including, for example, the target object or the target region scanned by the image acquisition device, the preferences of the operator, or the like. In some embodiments, the first threshold may be variable for different image acquisitions. If the count of pixels (determined in 10220) is larger than the first threshold, the process may proceed to 10250, in which it may be determined that the current frame includes a motion. Otherwise, the process may proceed to 10240, in which it may be determined that the current frame includes no motion.

In 10240, it may be determined that the current frame includes no motion.

In some embodiments, the processing device 140 (e.g., the scanning module 14620) may perform operation 10240.

In some embodiments, if it is determined that the current frame includes no motion, operation 9130 may be performed.

In 10250, it may be determined that the current frame includes a motion.

In some embodiments, the processing device 140 (e.g., the scanning module 14620) may perform operation 10250.

In some embodiments, if it is determined that the current frame includes a motion, operation 9120 may be performed.

It should be noted that the above description of process 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, whether the current frame includes a motion may be determined based on a reference image matrix. The reference image matrix may have the same size as the current frame. Each element of the reference image matrix may correspond to a pixel of the current frame. Each element of the reference image matrix may have a reference value. The reference image matrix may be determined by the image processing system 100, or may be preset by a user or operator via the terminal(s) 130. In some embodiments, in operations 10220 and/or 10230, the current frame may be directly compared with the reference image matrix, and a plurality of element differences between the current frame and the reference image matrix may be determined. In some embodiments, if a predetermined number of element differences is larger than 0, then it may be determined that the current frame includes a motion.

FIG. 11 is a flowchart illustrating an exemplary process for determining whether the current frame includes a moving object according to some embodiments of the present disclosure. In some embodiments, at least part of process 1100 may be performed by the processing device 140 (implemented in, for example, the computing device 200 shown in FIG. 2). For example, the process 1100 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140b illustrated in FIG. 14). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In some embodiments, operation 9120 illustrated in FIG. 9 may be performed according to the process 1100. The process 1100 may include one or more of the following operations:

In 11310, one or more moving objects in a previous frame may be obtained.

In some embodiments, the processing device 140 (e.g., the tracing module 14630) may perform operation 11310.

In some embodiments, the moving object(s) in the previous frame may be obtained and/or stored in the image processing process of the previous frame, so that in the processing of the current frame, the moving object(s) may be directly obtained. In operation 11310, the obtaining of the moving object(s) may refer to obtaining one or more sub-images associated with the moving object(s) in the previous frame (e.g., sub-images of the moving object(s) extracted from the previous frame). If the previous frame includes one or more moving objects, each of the one or more moving objects may be obtained. In some embodiments, a moving object may refer to a portion of the pixels in a frame. In some embodiments, the moving object(s) in the previous frame may be determined based on one or more image segmentation algorithms. Exemplary segmentation algorithms may include a threshold segmentation, a region growing segmentation, an energy-based 3D reconstruction segmentation, a level set-based segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the moving object(s) in the previous frame may be determined based on one or more pixels of the previous frame that each has a grey level difference larger than the grey level threshold. For example, a connected domain including at least a portion of the pixels may be determined as a moving object. As another example, a region including at least a portion of the pixels in which a distance between each two adjacent pixels is less than a threshold may be determined as a moving object. As a further example, a region including the pixels may be directedly determined as a moving object. In some embodiments, the pixels of the previous frame that each has a grey level difference larger than the grey level threshold may be determined according to one or more operations of the process 1000.

In 11320, a first position of each moving object (of the previous frame) in the current frame may be determined by performing matching of the each moving object (of the previous frame) in the current frame (with the moving object in the previous frame).

In some embodiments, the processing device 140 (e.g., the tracing module 14630) may perform operation 11320.

In some embodiments, each moving object in the previous frame may be matched in the current frame, and the position of a corresponding (candidate) moving object in the current frame may be determined. In sortie embodiments, in the matching process, a full frame matching may be performed. A full frame matching may refer that all pixels in the current frame may be used to be matched with the moving object in the previous frame. In some embodiments, the matching may be performed in an estimated region of the current frame. The estimated region may be determined according to a movement model of the moving object. In some embodiments, if the movement model is used, the full frame matching may not be required. Therefore, the computation amount may be reduced, and the processing efficiency may be improved.

In some embodiments, the movement model of a moving object may be generated based on a plurality of previous frames obtained prior to the current frame. For example, the movement model may be generated based on the positions of the moving object in the plurality of previous frames. In some embodiments, each moving object may have a corresponding movement model The movement models of different moving objects may be the same or different.

In 11330, an offset between the first position of the each moving object in the current frame and a second position of the each moving object in the previous frame may be determined.

In some embodiments, the processing device 140 (e.g., the tracing module 14630) may perform operation 11330.

In some embodiments, the position of the moving object in the current frame may be compared with the position of the moving object in the previous frame to obtain a position variation of the moving object (i.e., an offset).

In some embodiments, the offset may be denoted by a vector including an orientation (of the moving object between the current frame and the previous frame) and/or a distance (of the moving object between the current frame and the previous frame).

In 11340, whether the offset of at least one moving object is smaller than or equal to a second threshold may be determined.

In some embodiments, the processing device 140 (e.g., the tracing module 14630) may perform operation 11340.

In some embodiments, if the offset of a moving object is less than or equal to the second threshold, it may be determined that the moving object is in a stationary state in the current frame. If the offset(s) of one or more moving objects are larger than the second threshold, it may be determined that the moving object(s) are in a motion state in the current frame, thereby it may be determined that the current frame includes a moving object. That is, if there are two or more moving objects in the current frame, and it is determined that at least one object is in a motion state in the current frame, then it may be determined that the current frame includes a moving object, and the process may proceed to operation 11350. If it is determined that all the moving objects are in a static state in the current frame, then it may be determined that the current frame includes no moving object, and the process may proceed to operation 11360.

In 11350, it may be determined that the current frame of the plurality of frames includes a moving object.

In some embodiments, the processing device 140 (e.g., the tracing module 14630) may perform operation 11350.

In some embodiments, if it is determined that the current frame of the plurality of frames includes a moving object, operation 9140 may be performed.

In 11360, it may be determined that the current frame includes no moving object.

In some embodiments, the processing device 140 (e.g., the tracing module 14630) may perform operation 11360.

In some embodiments, if it is determined that the current frame includes no moving object, that is, the current frame is static relative to the previous frame, operation 9130 may be performed.

In some embodiments, if it is determined that the offset of the moving object is larger than the second threshold, it may be determined that the moving object is in a motion state in the current frame. In some embodiments, the position of the moving object that is in the motion state in the current frame may be stored. In some embodiments, the movement model of the moving object may be generated based on the positions of the moving object in a plurality of frames that are previously collected. Specifically, in some embodiments, the movement model(s) of the moving object(s) may be generated based on a point spread function. In some embodiments, in 11320, the position of the moving object in the current frame may be estimated according to the movement model, and the matching may be performed in a region around the estimated position, and the full frame matching may not be required. Therefore, the computation amount may be reduced, and the processing efficiency may be improved.

In some embodiments, if the previous frame includes a moving object, but the current frame does not include the moving object, that is, the moving object does not exist in the current frame, then an initial position of the moving object may be marked in the current frame. In some embodiments, it may be convenient to estimate the position of the moving object in the processing of a next frame posterior to the current frame based on the marked initial position of the moving object. In some embodiments, the movement of the moving object in a plurality of frame may be periodic. Therefore, the position of the moving object may be determined based on the marked initial position. In some embodiments, the initial position of the moving object may refer to the position of the moving object in a frame in which the moving object is detected for the first time.

It should be noted that the above description of process 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, before operation 11310, an operation for determining one or more moving objects existing in the previous frame may be added.

Figure 12:
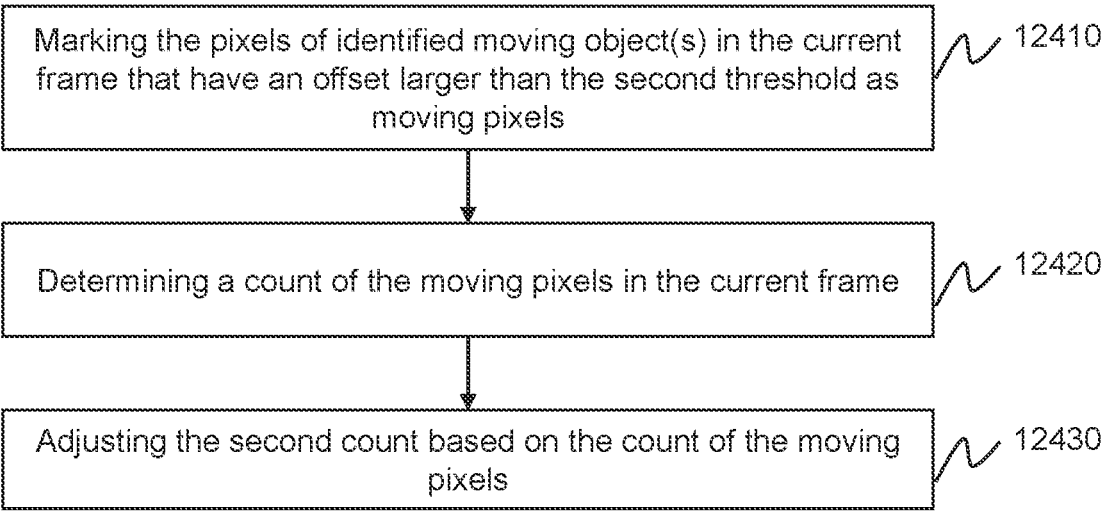
FIG. 12 is a flowchart illustrating an exemplary process for adjusting the second count according to some embodiments of the present disclosure.

FIG. 12 is a flowchart illustrating an exemplary process for adjusting the second count according to some embodiments of the present disclosure. In some embodiments, at least part of process 1200 may be performed by the processing device 140 (implemented in, for example, the computing device 200 shown in FIG. 2). For example, the process 1200 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140b illustrated in FIG. 14). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In some embodiments, the process(es) illustrated above may further include the operations illustrated in FIG. 12. The process 1200 may include one or more of the following operations:

In 12410, the pixels of identified moving object(s) in the current frame that have an offset larger than the second threshold may be marked as moving pixels.

In some embodiments, the processing device 140 (e.g., the blur removal module 14640) may perform operation 12410.

In some embodiments, in the marking process, the moving pixels in the current frame may be marked using different colors or symbols, characters, etc. In some embodiments the positions of the moving pixels in the current frame may be stored for further use.

In 12420, a count of the moving pixels in the current frame may be determined.

In some embodiments, the processing device 140 (e.g., the blur removal module 14640) may perform operation 12420.

In some embodiments, the movement intensity of the moving objects in a frame may be related to the count of pixels in the frame that have changed positions, that is, related to the count of moving pixels. If a frame has a relatively large count of moving pixels, the movement intensity of the moving object(s) in the frame may be relatively large.

In 12430, the second count may be adjusted based on the count of the moving pixels in the current frame.

In some embodiments, the processing device 140 (e.g., the blur removal module 14640) may perform operation 12430. In some embodiments, the second count and the count of the moving pixels may have a negative correlation. In some embodiments, if the count of the moving pixels increases, the second count may be decreased. In some embodiments, the correlation between the second count and the count of the moving pixels may be denoted by a table.

In some embodiments, a correspondence table between the second count and the count of the moving pixels may be stored in advance. In the correspondence table, if the count of the moving pixels is relatively large, the second count may be relatively small. Therefore, the second count may be determined based on the correspondence table and the count of the moving pixels.

Figure 13:
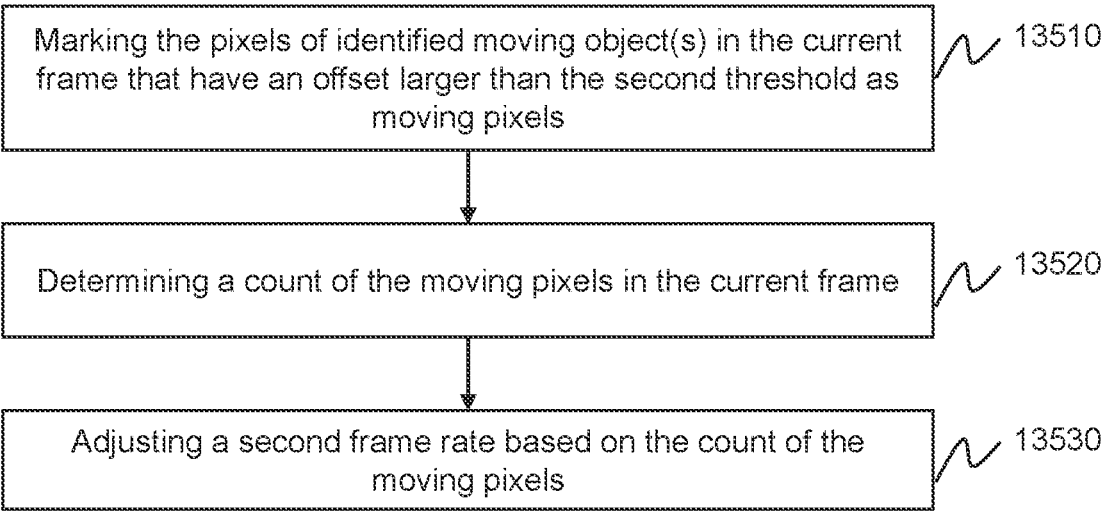
FIG. 13 is a flowchart illustrating an exemplary process for adjusting the second frame rate according to some embodiments of the present disclosure.

FIG. 13 is a flowchart illustrating an exemplary process for adjusting the second frame rate according to some embodiments of the present disclosure. In some embodiments, at least part of process 1300 may be performed by the processing device 140 (implemented in, for example, the computing device 200 shown in FIG. 2). For example, the process 1300 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140*b* illustrated in FIG. 14). The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting.

In some embodiments, the process(es) illustrated above may further include the operations illustrated in FIG. 13. The process 1300 may include one or more of the following operations:

In 13510, the pixels of identified moving object(s) in the current frame that have an offset larger than the second threshold may be marked as moving pixels.

In some embodiments, the processing device 140 (e.g., the blur removal module 14640) may perform operation 13510.

In 13520, a count of the moving pixels in the current frame may be determined.

In some embodiments, the processing device 140 (e.g., the blur removal module 14640) may perform operation 13520.

In 13530, the second frame rate may be adjusted based on the count of the moving pixels in the current frame.

In some embodiments, the processing device 140 (e.g., the blur removal module 14640) may perform operation 13530. In some embodiments, the second frame rate and the count of the moving pixels may have a positive correlation. In some embodiments, if the count of the moving pixels increases, the second frame rate may be increased. In some embodiments, the correlation between the second frame rate and the count of the moving pixels may be denoted by a table.

In some embodiments, a correspondence table between the second frame rate and the count of the moving pixels may be stored in advance. In the correspondence table, if the count of the moving pixels is relatively large, the second frame rate may be relatively large. Therefore, the second frame rate may be determined based on the correspondence table and the count of the moving pixels in the current frame.

In some embodiments, if it is determined in 9120 that the current frame of the plurality of frames includes a moving object, the motion displacement of the moving object may be further determined. The motion displacement of the moving object may be the offset of the moving object between the current frame and the previous frame. That is, the position in the current frame may be compared with the position in the previous frame to obtain the motion displacement. According to the motion displacement, the movement intensity of the moving object in the current frame may be determined. Therefore, the second count may be adjusted according to the motion displacement, so that the second count decreases as the motion displacement increases, thereby avoiding the motion artifacts induced by the superimposing process of two or more frames.

Figure 14:
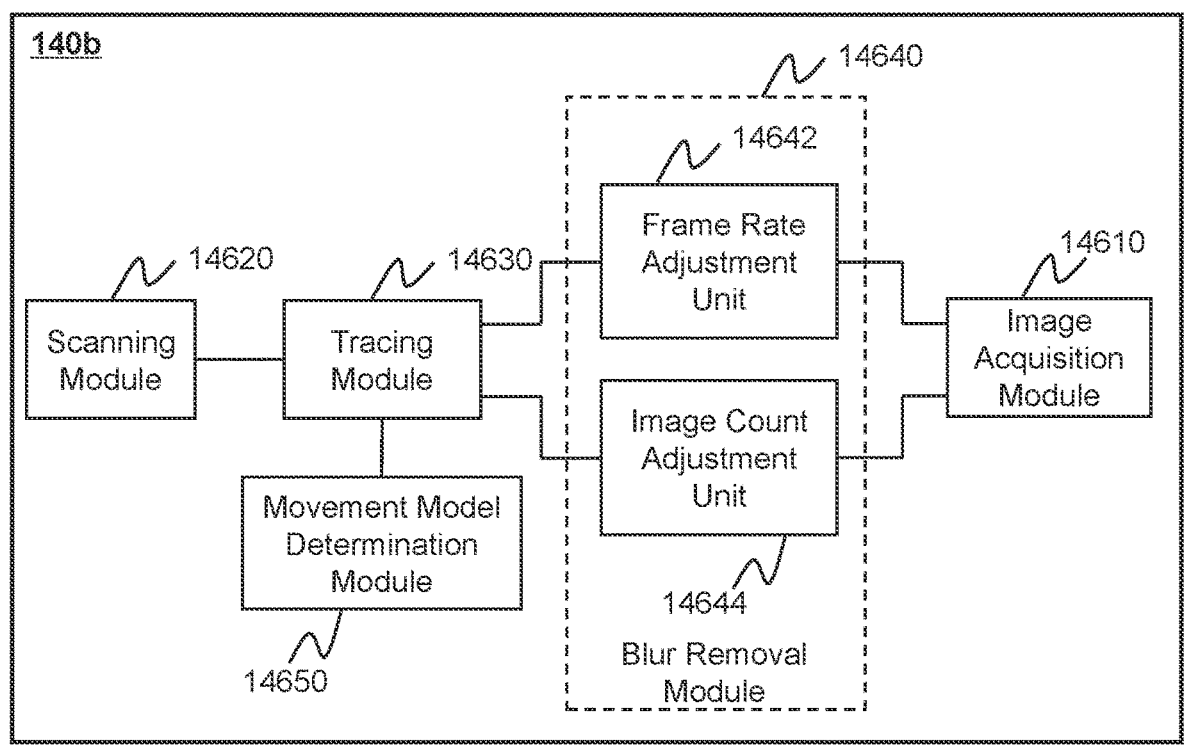
FIG. 14 is a block diagram illustrating an exemplary processing device according to some embodiments of the present disclosure.

FIG. 14 is a block diagram illustrating an exemplary processing device according to some embodiments of the present disclosure.

In some embodiments, as shown in FIG. 14, an exemplary image processing device is provided. Referring to FIG. 14, the processing device 140*b* may include an image acquisition module 14610, a scanning module 14620, a tracing module 14630, and a blur removal module 14640. The image acquisition module 14610 may be configured to collect one or more images. The scanning module 14620 may be configured to detect whether a current frame includes a motion. The tracing module 14630 may be configured to determine whether the current frame includes a moving object. The blur removal module 14640 may be configured to acquire a first count of frames at a first frame rate for superimposing if the tracing module 14630 determines that the current frame includes no moving object. If the tracing module 14630 determines that the current frame of the plurality of frames incudes a moving object, the blur removal module 14640 may acquire a second count of frames at a second frame rate for superimposing. In some embodiments, the second frame rate may be larger than the first frame rate, and/or the second count may be less than the first count. The second count and the first count may be positive integers.

In some embodiments, the image acquisition module 14610 may acquire one or more fluoroscopic images, e.g., one or more X-ray fluoroscopic images. In some embodiments, the image acquisition module 14610 may include a radiation source and a detector. The radiation source may be configured to generate X-rays. The detector may detect X-rays that pass through the target region or target object, and/or generate X-ray fluoroscopic image(s). In some embodiments, the image acquisition module 14610 may be set in the scanner 110 (e.g., a C-arm device).

In some embodiments, the blur removal module 14640 may include a frame rate adjustment unit 14642 and/or an image count adjustment unit 14644. The frame rate adjustment unit 14642 may be configured to acquire the first count of frames at the first frame rate for superimposing in response to the tracing module 14630 determining that the current frame includes no moving object. The image count adjustment unit 14644 may be configured to acquire the second count of frames at the second frame rate for superimposing in response to the tracing module 14630 determining that the current frame of the plurality of frames includes a moving object.

In some embodiments, the scanning module 14620 may be configured to compare the grey level of each pixel in the current frame with the grey level of a corresponding pixel in the previous frame according to an inter-frame difference algorithm to obtain a grey level difference of the each pixel. The scanning module 14620 may be further configured to determine the count of pixels that each has a grey level difference larger than a grey level threshold in the current frame. In some embodiments, the scanning module 14620 may determine that the current frame includes a motion in response to a determination that the count of pixels is larger than a first threshold. In some embodiments, the scanning module 14620 may determine that the current frame includes no motion in response to a determination that the count of pixels is less than or equal to the first threshold.

In some embodiments, the tracing module 14630 may be further configured to obtain one or more moving objects in the previous frame. In some embodiments, the tracing module 14630 may match each moving object of the previous frame in the current frame to determine the position of the moving object in the current frame. In some embodiments, the tracing module 14630 may determine the offset of each moving object between the previous frame and then current frame. In some embodiments, the tracing module 14630 may determine that the current frame of the plurality of frames includes a moving object in response to determining that at least one of the moving objects has an offset larger than a second threshold. In some embodiments, the tracing module 14630 may determine that the current frame includes no moving object in response to determining that the offset of each moving object is less than or equal to the second threshold.

In some embodiments, the processing device 140*b* may further include a storage module for storing the positions of the moving objects that have an offset larger than the second threshold in the current frame.

In some embodiments, the processing device 140*b* may further include a movement model determination module 14650. The movement model determination module 14650 may be configured to generate a movement model of each moving object based on one or more images that are collected prior to the current frame. In some embodiments, the tracing module 14630 may estimate the position of a moving object in the current frame according to the movement model, and match the moving object of the previous frame in a region around the estimated position of the current frame to determine the position of the moving object in the current frame.

In some embodiments, the movement model determination module 14650 may be further configured to mark an initial position of the moving object in the current frame in response to determining that the previous frame includes a moving object but the current frame does not include the moving object. Accordingly, the tracing module 14630 may estimate the position of the moving object in a next frame posteriors to the current frame. The scanning module 14620, the tracing module 14630, and the movement model determination module 14650 may cooperate to improve the detection accuracy of moving object(s).

In some embodiments, the tracing module 14630 may be further configured to mark each pixel of the moving object that has an offset larger than the second threshold as a moving pixel, and determine the count of moving pixels in the current frame. The image count adjustment unit 14644 may be configured to adjust the second count according to the count of moving pixels in the current frame, so that the second count may decrease as the count of moving pixels increases. In some embodiments, the storage module may be further configured to store a correspondence table associated with a correlation between the second count and the count of moving pixels, so that the image count adjustment unit 14644 may determine the second count according to the correspondence table.

In some embodiments, the frame rate adjustment unit 14642 may be configured to adjust the second frame rate according to the count of moving pixels, so that the second frame rate may increases as the count of moving pixels increases.

In some embodiments, the tracing module 14630 may be further configured to determine a motion displacement of the moving object in response to a determination that the current frame include a moving object. The image count adjustment unit 14644 may adjust the second count according to the motion displacement such that the second count may decrease as the motion displacement increases. In some embodiments, the correspondence table associated with a correlation between the motion displacement and the second count may be stored in advance for further use.

Figure 15:
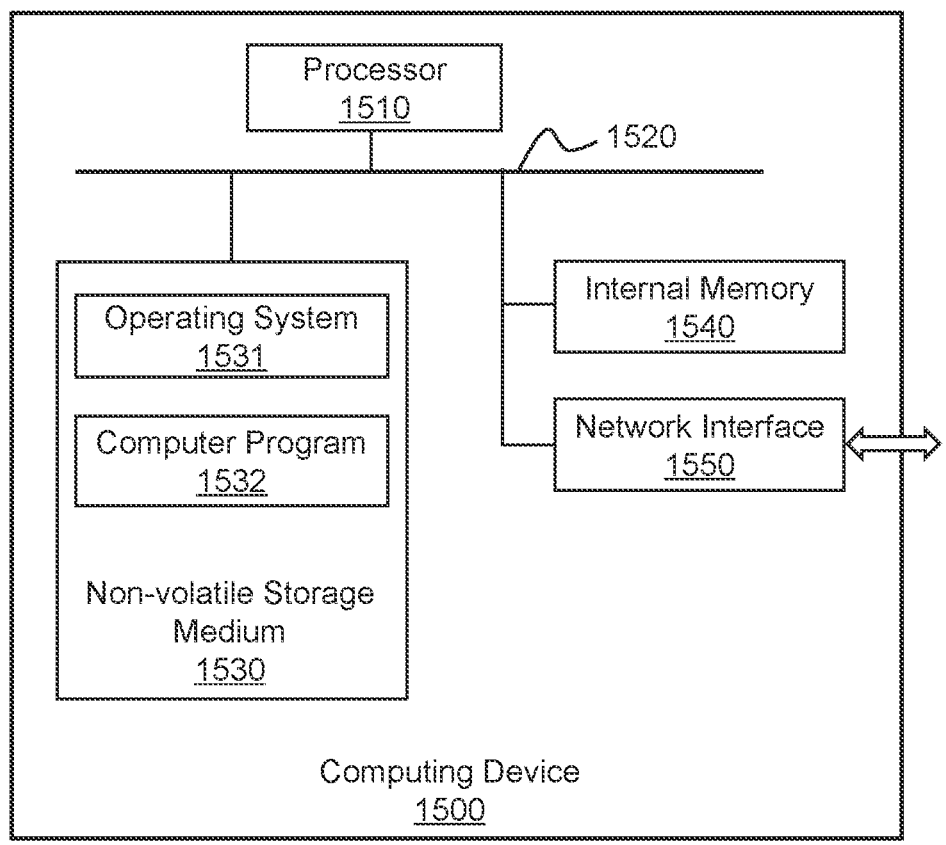
FIG. 15 is a block diagram illustrating an exemplary computing device according to some embodiments of the present disclosure.

FIG. 15 is a block diagram illustrating an exemplary computing device according to some embodiments of the present disclosure.

In some embodiments, an exemplary computing device is provided. The components of the computing device 1500 is shown in FIG. 15. The computing device 1500 may include a processor 1510, a storage, and a network interface 1550 connected through a system bus 1520. The processor 1510 of the computing device 1500 may be configured to provide computing and/or control capabilities. The storage of the computing device 1500 may include a non-volatile storage medium 1530 and an internal memory 1540. The non-volatile storage medium 1530 may store an operating system 1531 and computer program(s) 1532. The internal memory 1540 may provide an environment for the operation of the operating system 1531 and computer program(s) 1532 in the non-volatile storage medium 1530. The network interface 1550 of the computing device 1500 may be configured to communicate with an external terminal through a network connection. The computer program(s) 1532 may be executed by the processor 1510 to implement the operations of the image processing method illustrated in the present disclosure. It may be understood by those skilled in the art that the structure shown in FIG. 15 is merely a block diagram of a part of the structure related to the present disclosure, and does not constitute a limitation on the computing device to which the present disclosure scheme is applied. The computing device may include more or fewer components than those shown in the figures, or some components may be combined, or have different component arrangements.

In some embodiments, a computing device including a storage and a processor may be provided. The storage may store a computer program. The processor may implement one or more of the operations illustrated above when executing the computer program.

In some embodiments, a computer readable non-volatile storage medium storing instructions may be provided. The instructions, when executed by the processor, may cause the processor to implement one or more of the operations illustrated above.

Figure 16:
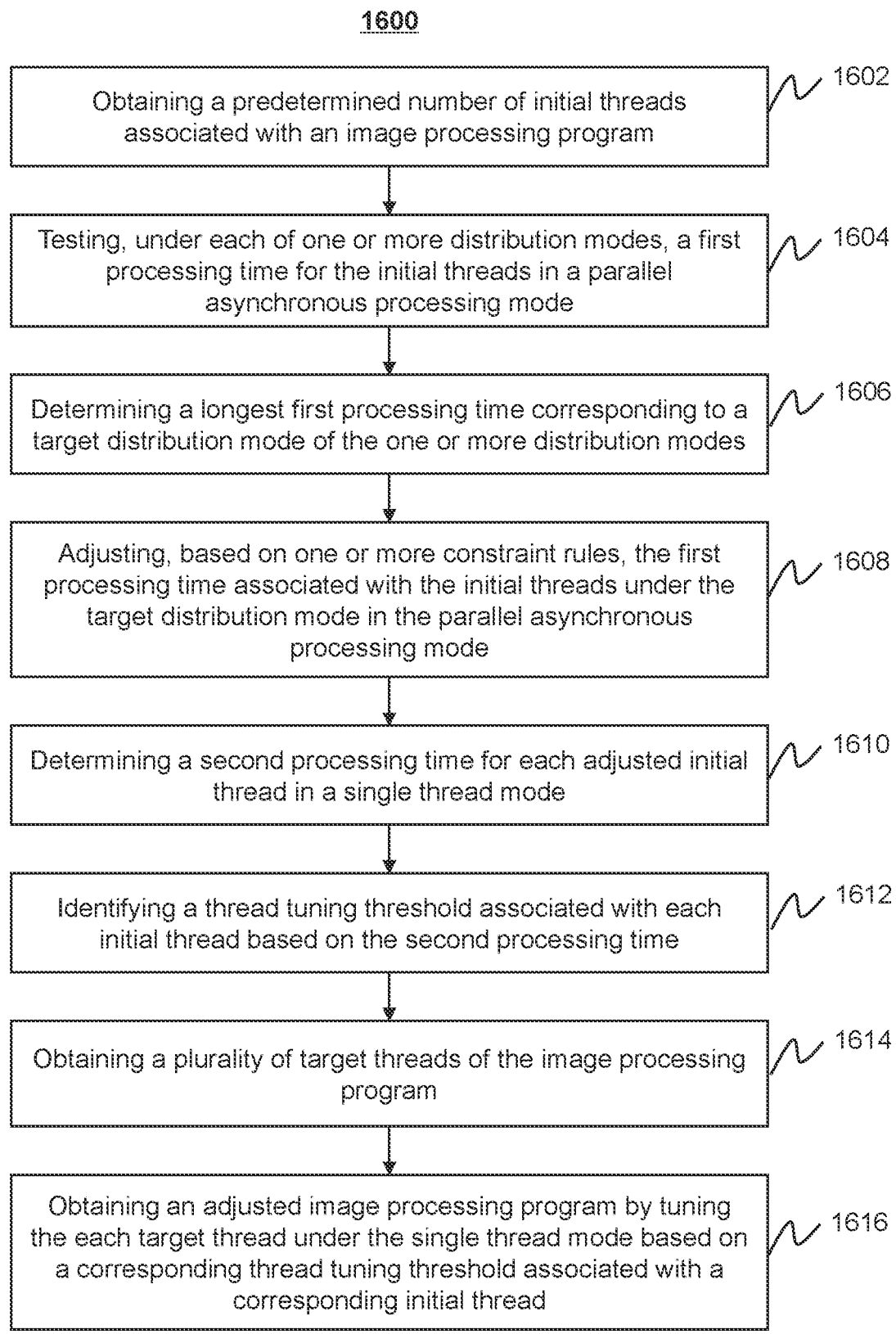
FIG. 16 is a flowchart illustrating an exemplary process for tuning threads of an image processing program according to some embodiments of the present disclosure.

FIG. 16 is a flowchart illustrating an exemplary process for tuning threads of an image processing program according to some embodiments of the present disclosure. In some embodiments, at least part of process 1600 may be performed by the processing device 140 (implemented in, for example, the computing device 200 shown in FIG. 2). For example, the process1600 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, one or more modules in the processing device 140a illustrated in FIG. 7, and/or one or more modules in the processing device 140b illustrated in FIG. 14). The operations of the illustrated process presented below are intended to be illustrative. In some embodiments, the process 1600 may be accomplished with one or more additional operations not described, and/or without one or more of the operations discussed. Additionally, the order in which the operations of the process 1600 as illustrated in FIG. 16 and described below is not intended to be limiting.

In 1602, a predetermined number of initial threads associated with an image processing program may be obtained.

In some embodiments, the processing device 140 (e.g., the obtaining module 7406) may perform operation 1602. In some embodiments, the initial threads may be obtained from one or more storage devices (e.g., the storage device 150, the storage 220, and/or the storage 390) and/or an external data source. In some embodiments, the predetermined number may be set by the user. In some embodiments, the image processing program may include one or more operations illustrated in FIGS. 9-13. In some embodiments, the image processing program may include one or more target threads. In some embodiments, the predetermined number may be determined according to the number (or count) of target threads in the image processing program. More descriptions of the initial threads, the target threads, and/or the obtaining of initial threads may be found elsewhere in the present disclosure (e.g., FIG. 4 and descriptions thereof).

In 1604, a first processing time (e.g., a total processing time) for the initial threads may be tested under each of one or more (predetermined) distribution modes, and/or in a parallel asynchronous processing mode. In some embodiments, the first processing time associated with the initial threads may include a processing time of each initial thread, and/or a total processing time of the initial threads. In some embodiments, a total processing time of the initial threads may be tested under each distribution mode, and thus, one or more (total) processing times may be determined. More descriptions of the distribution modes, and the testing of the processing time of the initial threads may be found elsewhere in the present disclosure (e.g., FIG. 4 and descriptions thereof).

In 1606, a longest first processing time corresponding to a target distribution mode of the one or more distribution modes may be determined. In some embodiments, the processing device 140 (e.g., the adjustment module 7404) may perform operation 1606. In some embodiments, the target distribution mode may refer to a distribution mode that has a longest processing time, i.e., a distribution mode that has the lowest load performance. The longest processing time may be determined based on the one or more (total) processing times tested in 1604. More descriptions of the target distribution mode may be found elsewhere in the present disclosure (e.g., FIG. 4 and descriptions thereof).

In 1608, the first processing time associated with the initial threads may be adjusted, based on one or more constraint rules, under the target distribution mode in the parallel asynchronous processing mode. In some embodiments, the processing device 140 (e.g., the adjustment module 7404) may perform operation 1608. In some embodiments, the processing time of each initial thread may be adjusted. More descriptions of the constraint rules, and the adjustment of the first processing time associated with the initial threads may be found elsewhere in the present disclosure (e.g., FIGS. 4-5, and descriptions thereof).

In 1610, a second processing time for each adjusted initial thread may be determined in a single thread mode. In some embodiments, the processing device 140 (e.g., the determination module 7408) may perform operation 1610. More descriptions of the determination of the processing time for each adjusted initial thread may be found elsewhere in the present disclosure (e.g., FIG. 4 and descriptions thereof).

In 1612, a thread tuning threshold associated with each initial thread (or each adjusted initial thread) may be identified based on the second processing time. In some embodiments, the processing device 140 (e.g., the determination module 7408) may perform operation 1612. In some embodiments, a plurality of thread tuning thresholds associated with the plurality of initial thread may be identified. The plurality of thread tuning thresholds may be the same or different. More descriptions of the identification of the thread tuning threshold(s) may be found elsewhere in the present disclosure (e.g., FIG. 4 and descriptions thereof).

In 1614, a plurality of target threads of the image processing program may be obtained. In some embodiments, the processing device 140 (e.g., the obtaining module 7406) may perform operation 1614. In some embodiments, the target threads may include a first thread associated with processing an image frame at a first frame rate, and/or a second thread associated with processing the image frame at a second frame rate. In some embodiments, the target threads may include a third thread associated with determining whether a current frame includes a moving object, and/or a fourth thread associated with acquiring a certain count (e.g., the first count, the second count) of frames at a certain frame rate (e.g., the first frame rate, the second frame rate), and/or processing the acquired frames. In some embodiments, the target threads may include a fifth thread associated with processing frame(s), and/or a sixth thread associated with generating a movement model. In some embodiments, the number (count) of the plurality of target threads may be equal to the predetermined number. In some embodiments, each target thread may correspond to an initial thread (or adjusted initial thread). In some embodiments, the computation amount, the computational manner, the computation algorithm(s), and/or the processing algorithm(s), or the like, of (or used in) each target thread may be similar to that of (or used in) a corresponding initial thread (or adjusted initial thread). In some embodiments, operation 1614 may be performed before operation 1602, and the predetermined number may be determined according to the count of the target threads. More descriptions of obtaining of the target threads may be found elsewhere in the present disclosure (e.g., FIG. 4, and descriptions thereof).

In 1616, an adjusted image processing program may be obtained by tuning the each target thread under the single thread mode based on a corresponding thread tuning threshold associated with a corresponding initial thread (or a corresponding adjusted initial thread). In some embodiments, the processing device 140 (e.g., the tuning module 7410) may perform operation 1616. More descriptions of thread tuning may be found elsewhere in the present disclosure (e.g., FIGS. 4 and 6, and the descriptions thereof).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, device, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one machine each of which has at least one processor and at least one storage device for image processing, the method comprising:
    obtaining a plurality of frames, each of the plurality of frames comprising a plurality of pixels;
    determining, based on the plurality of frames, whether a current frame of the plurality of frames comprises a moving object;
    in response to determining that the current frame includes no moving object,
        obtaining a first count of frames, at least a portion of the first count of frames being obtained at a first frame rate;
        generating a target image by performing a weighted averaging operation on the first count of frames;
    in response to determining that the current frame includes a moving object,
        obtaining a second count of frames, at least a portion of the second count of frames being obtained at a second frame rate, wherein the second frame rate is larger than the first frame rate, or the second count is smaller than the first count; and
        generating the target image by performing a weighted averaging operation on the second count of frames.

2. The method of claim 1, wherein in response to determining that the current frame includes no moving object, the obtaining a first count of frames comprises at least one of:
    acquiring the first count of frames at the first frame rate;
    obtaining the first count of frames from the plurality of frames; or
    obtaining a first portion of the first count of frames from the plurality of frames, and acquiring a second portion of the first count of frames at the first frame rate.

3. The method of claim 2, wherein in response to determining that the current frame includes a moving object, the obtaining a second count of frames comprises at least one of:
    acquiring the second count of frames at the second frame rate;
    obtaining the second count of frames from the plurality of frames; or
    obtaining a first portion of the second count of frames from the plurality of frames, and acquiring a second portion of the second count of frames at the second frame rate.

4. The method of claim 3, further comprising:
    detecting whether the current frame comprises a motion, wherein the detecting whether the current frame comprises the motion comprises:
        comparing a grey level of at least one pixel of the current frame with a grey level of a corresponding pixel of a previous frame obtained prior to the current frame of the plurality of frames; and
        determining whether the current frame comprises the motion based on a comparison result.

5. The method of claim 4, wherein the comparing a grey level of at least one pixel of the current frame with a grey level of a corresponding pixel of a previous frame obtained prior to the current frame of the plurality of frames comprises:
    determining a grey level difference between a grey level of each pixel of the current frame and a grey level of a corresponding pixel of the previous frame.

6. The method of claim 5, wherein determining whether the current frame comprises the motion based on a comparison result comprises:
    determining a third count of pixels of the current frame that each has a grey level difference with a grey level of a corresponding pixel larger than a grey level threshold;
    comparing the third count with a first threshold; and
    in response to determining that the third count is larger than the first threshold, determining the current frame comprises the motion; or
    in response to determining that the third count is smaller than or equal to the first threshold, determining the current frame comprises no motion.

7. The method of claim 4, wherein determining, based on the plurality of frames, whether a current frame of the plurality of frames comprises a moving object comprises:
    determining one or more moving objects existing in the previous frame;
    obtaining the one or more moving objects in the previous frame;
    for each of the one or more moving objects,
        determining a first position of the each moving object in the current frame by performing matching of the each moving object in the current frame with a corresponding moving object in the previous frame;
        determining an offset between the first position of the each moving object in the current frame and a second position of the each moving object in the previous frame;
    determining whether the offset of at least one of the one or more moving objects is larger than a second threshold; and
    in response to determining that the offset of at least one of the one or more moving objects is larger than the second threshold, determining the current frame comprises a moving object; and
    in response to determining that the offsets of the one or more moving objects are smaller than or equal to the second threshold, determining the current frame comprises no moving object.

8. The method of claim 7, further comprising:
    in response to determining that the offset of at least one of the one or more moving objects is larger than the second threshold,
        storing, in a storage device, the first position of the at least one of the one or more moving objects in the current frame; or
        adjusting the second count based on the offset.

9. The method of claim 7, further comprising:
    generating a movement model for each moving object of the one or more moving objects based on a plurality of previous frames obtained prior to the current frame of the plurality of frames.

10. The method of claim 9, wherein the determining a first position of the each moving object in the current frame by performing matching of the each moving object in the current frame comprises:
  for each of the one or more moving objects,
    estimating a position of the each moving object in the current frame based on a movement model corresponding to the each moving object; and
    determining the first position of the each moving object in the current frame based on the estimated position.

11. The method of claim 7, further comprising:
  in response to determining that the previous frame includes a specific moving object but the current frame does not include the specific moving object,
    marking an initial position of the moving object in the current frame.

12. The method of claim 7, further comprising:
  marking the pixels of one or more determined moving objects in the current frame that have an offset larger than the second threshold as moving pixels; and
  adjusting the second count or the second frame rate based on a fourth count of the moving pixels in the current frame.

* * * * *